United States Patent [19]

Herolz et al.

[11] 4,293,934
[45] Oct. 6, 1981

[54] CIRCUMFERENTIAL ACOUSTIC DEVICE

[75] Inventors: Robert A. Herolz, Willis; Charles B. Vogel, Houston, both of Tex.

[73] Assignee: Shell Oil Company, Houston, Tex.

[21] Appl. No.: 49,753

[22] Filed: Jun. 18, 1979

[51] Int. Cl.³ .............................................. G01V 1/40
[52] U.S. Cl. ...................................... 367/27; 367/31; 367/911; 346/33 WL
[58] Field of Search ...................... 367/27, 30, 31, 75, 367/911; 181/103, 104; 346/33 WL

[56] References Cited

U.S. PATENT DOCUMENTS

| | | | |
|---|---|---|---|
| 3,363,719 | 1/1968 | Venghiattes | 367/911 |
| 3,375,897 | 4/1968 | Engle et al. | 367/27 |
| 3,464,513 | 9/1969 | Roever | 367/35 |
| 3,474,878 | 10/1969 | Loren | 367/35 |
| 3,475,722 | 10/1969 | White | 367/31 |
| 3,775,739 | 11/1973 | Vogel | 367/75 |
| 3,794,976 | 2/1974 | Obekler | 367/75 |
| 3,883,841 | 5/1975 | Norel et al. | 367/25 |
| 3,949,352 | 4/1976 | Vogel | 367/31 |
| 4,130,816 | 12/1978 | Vogel et al. | 367/35 |

*Primary Examiner*—Nelson Moskowitz

[57] ABSTRACT

A method and apparatus for acoustical logging wherein a plurality of transducers are spaced circumferentially in a plane perpendicular to the borehole and in close proximity to the wall of the borehole. Numerous circumferential acoustic transmission paths are defined by using some of the transducers as transmitters and others as receivers. Ultrasound is transmitted and received separately along each of the paths and amplitudes of the received waves are separately recorded to provide a side-by-side comparison of the signals. The received waves may be comprised of shear waves and compressional waves, and the shear wave amplitude may be recorded to the exclusion of later arriving waves. Proper spacing of the transmitters and receivers will produce a complete circumferential acoustic log of the borehole that can be used to detect the presence of vertical fractures.

21 Claims, 17 Drawing Figures

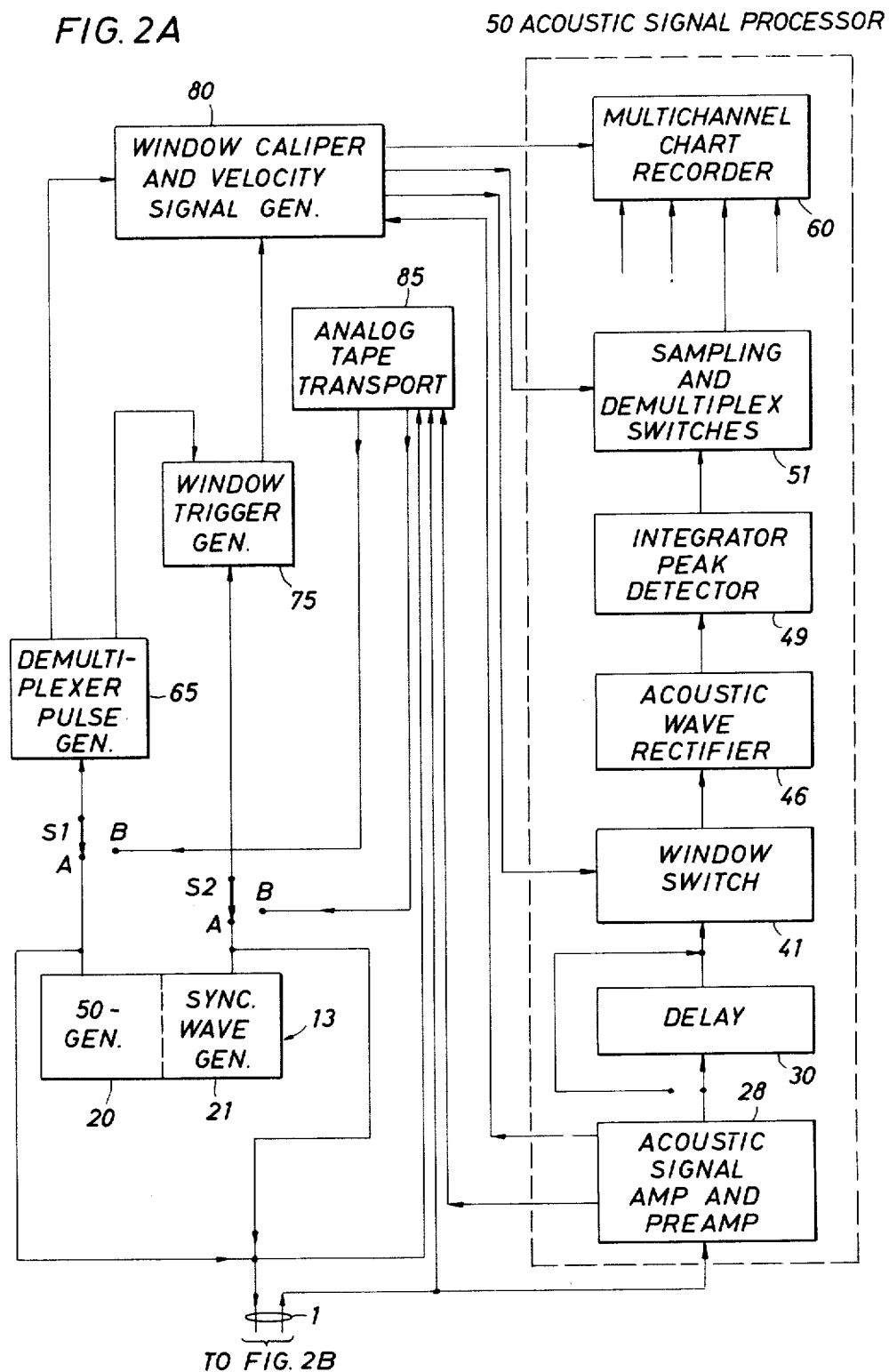

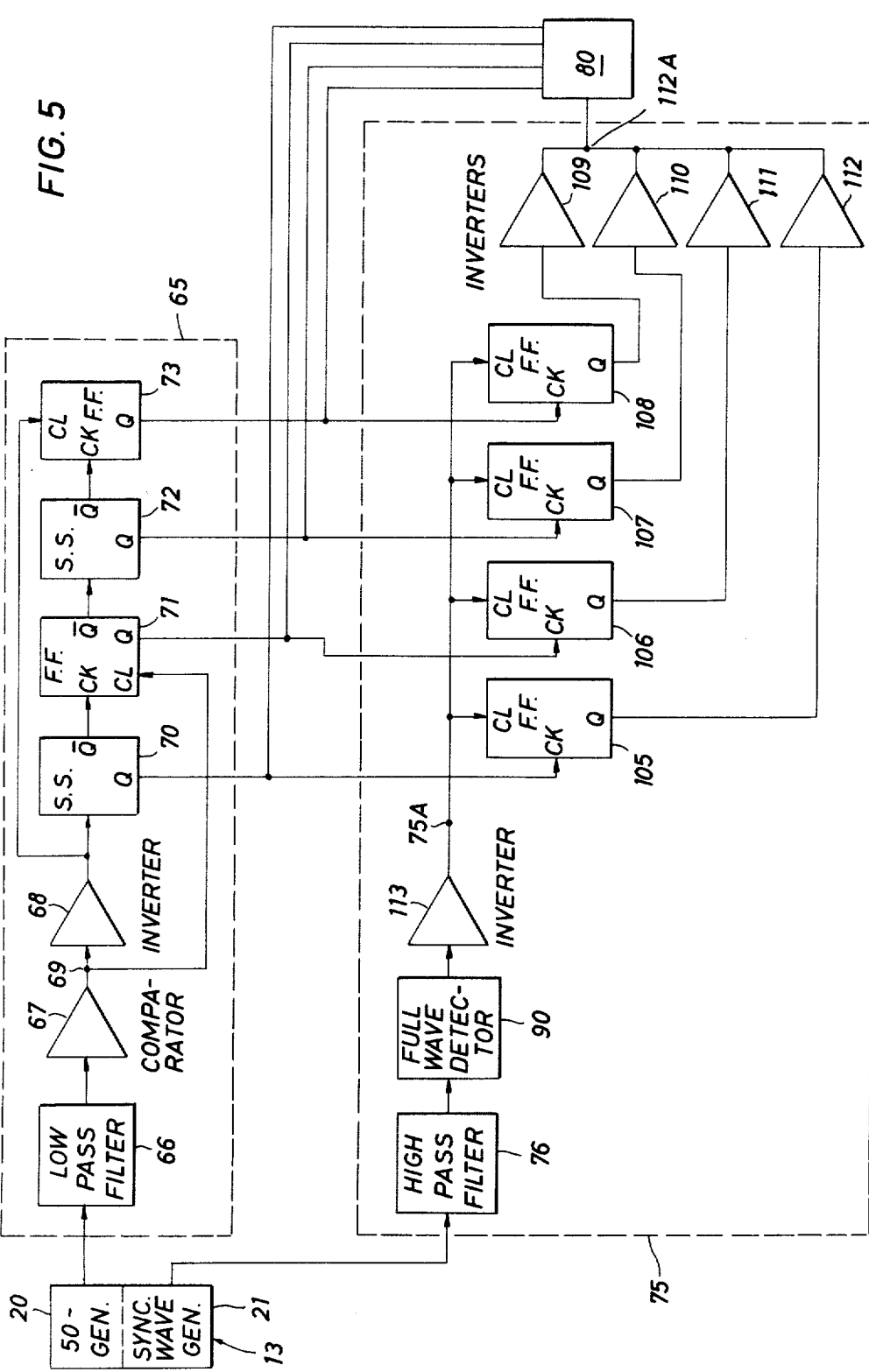

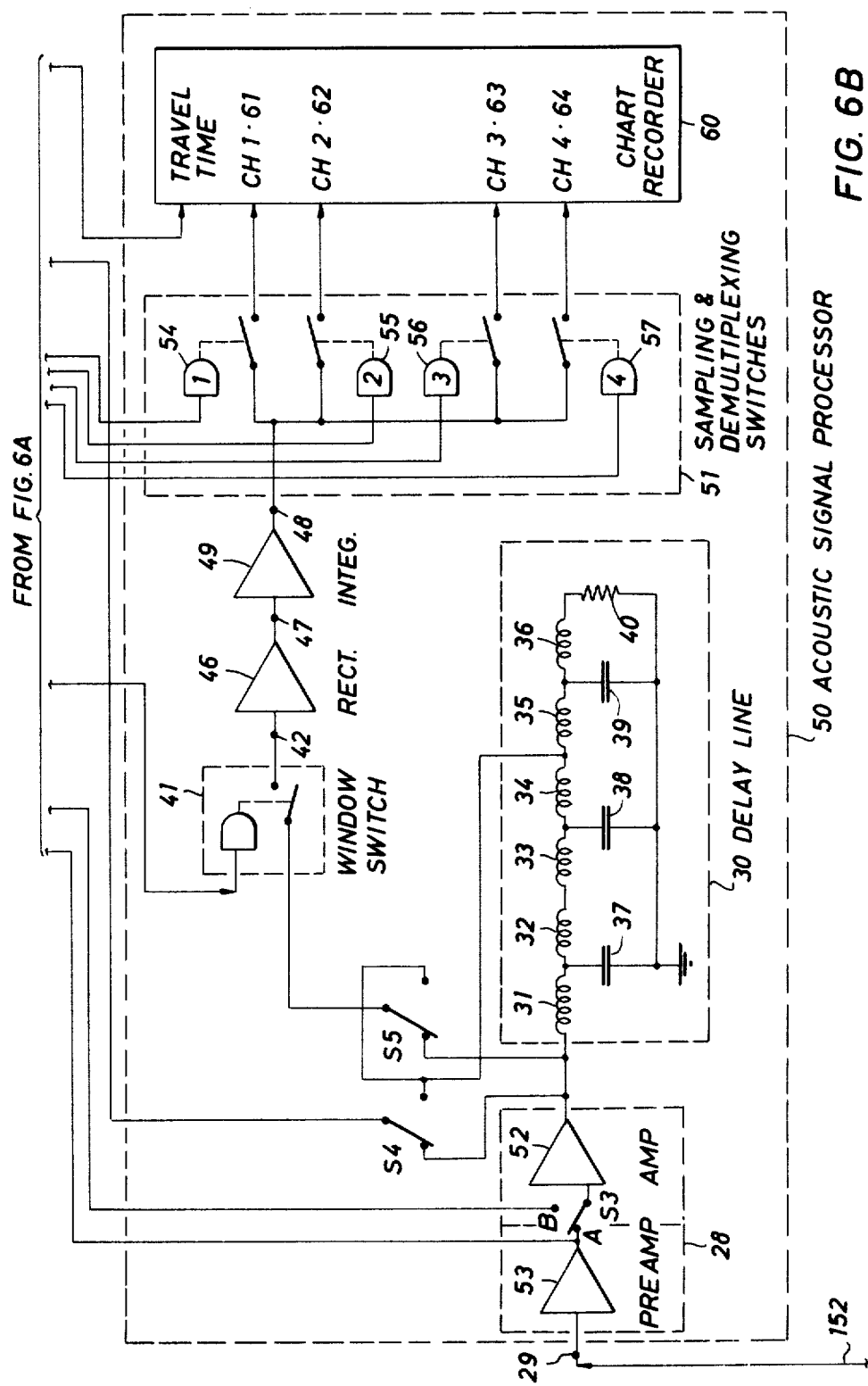

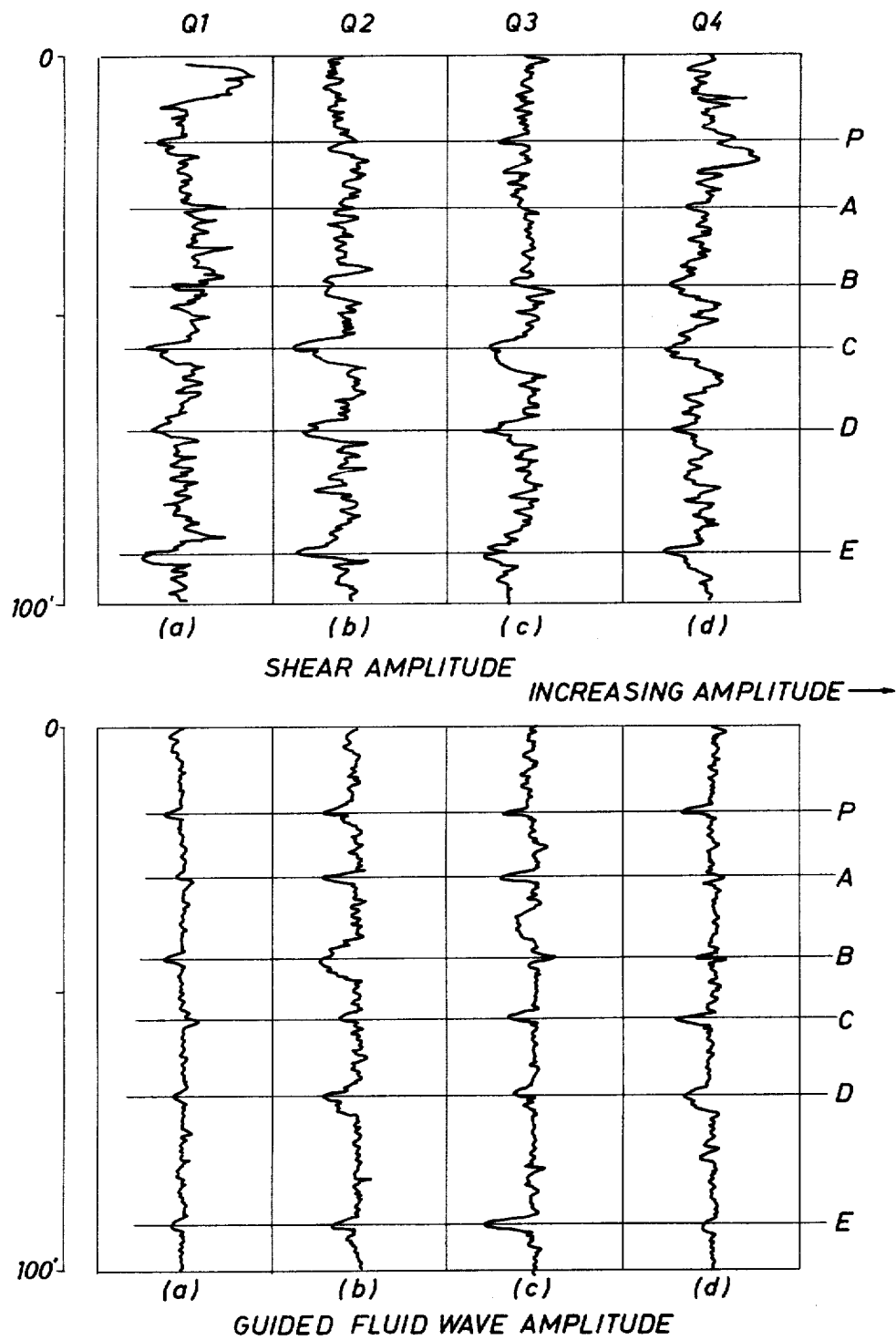

CIRCUMFERENTIAL ACOUSTIC DEVICE

BACKGROUND OF THE INVENTION

The present invention relates to a method and apparatus for acoustical logging, and more particularly, to a method and apparatus utilizing ultrasonic energy to detect the presence of vertical fractures and anomalies in the earth formations surrounding a borehole. It is of considerable importance in the petroleum industry to detect vertical fractures, since many formations produce hydrocarbons through fractured reservoirs. Most well logging devices are designed for responding to horizontally extending anomalies and therefore are not suitable for locating these vertical fractures.

Prior attempts at detecting the presence of vertical fractures generally have resorted to acoustic logging means. Typically, attempts have been made to produce acoustic waves that would travel circumferentially around the borehole to detectors where the acoustic waves would be received. Two types of acoustic waves are normally generated by the acoustic logging device, shear waves and compressional waves. Compressional waves will pass through a fluid filled fracture with little or no attenuation, while the shear waves, which are readily propagated only in solid materials, are significantly attenuated by the fluid filled fracture. Hence, in the prior art attempts, if a compressional wave, but no shear wave, was present, it was an indication that a vertical fracture was present in the formation. Prior attempts at detecting fractures in acoustic logging have failed in several respects. One approach, described in U.S. Pat. No. 2,934,694 sought to direct shear waves along the borehole wall. Variations of the received shear wave were observed as an indication of the presence of open fractures. The logging device utilized continuous acoustic waves, which gave rise to special transmission and separation problems. Physical separation of the transmitter and receiver was used to separate the shear wave from the compressional wave, it being recognized that the shear waves travel at a lesser velocity than does an associated compressional wave. Since different formation materials may significantly alter the speeds of propagation of the two types of waves, the approach was not entirely successful. U.S. Pat. No. 3,585,580 describes a device which sought to utilize the shear wave energy by projecting the acoustic wave into the formation at such an angle of incidence that the shear wave energy would be maximized while the compressional wave energy would be minimized. Rather than using a continuous acoustic signal, a narrow ultrasonic beam was used to generate the acoustic waves in the formation. Under the assumption that the compressional waves were essentially nonexistent, gating circuitry was used to initiate the recording of the received acoustic wave shortly after its arrival at a detector and to continue recording the wave for a period of predetermined duration based on the average velocity of the shear wave through the transmission medium. While this approach made improvements over the prior art, it was not altogether successful, possibly due to the arrival of compressional waves notwithstanding the particular angle of incidence used, or possibly due to the recordation of waves other than the shear wave during the fixed period of recordation. Another approach, described in U.S. Pat. No. 3,794,976 utilized substantially omni-directional transmitters to produce acoustical waves which travel through the formation about the circumference of the borehole. This device was directed particularly toward the detection of vertical fractues, using a particular angle of orientation of the transmitters with respect to the receivers to minimize the compressional wave effect. Thus, it was assumed that all waves received were shear waves. This approach suffered from some disadvantages, possibly due to the fact that the transmitting transducers were located a considerable distance from the surface of the borehole wall. In addition, some compressional wave energy was possibly received by the receiving transducers, resulting in erroneous interpretations. Still another approach utilized two sets of transmitting transducers in an attempt to detect vertical fractures. In the device described by U.S. Pat. No. 3,775,739, one set of transmitting transducers was oriented to provide substantially compressional waves in the formation while another set of transmitting transducers was oriented to provide substantially shear waves in the formation. This approach was a considerable improvement over the single omnidirectional transducer in that the shear waves and compressional waves were separately produced and recorded. While this approach improved the results, it also included the additional complication of having two sets of transmitting transducers and two sets of separate receiving transducers in place of a single-transmitting and single-receiving device.

Accordingly, it is an object of the present invention to overcome the difficulties of conventional systems for detecting vertical fractures in formations.

Another object of the invention is to provide a method and apparatus for detecting vertical fractures from electrical signals produced solely by shear waves transmitted through the formations adjacent the borehole.

Another object of the invention is to provide improved electrical circuitry for separating the shear waves from any later arriving compressional waves.

Another object of the invention is to provide improved electrical circuitry for detecting and recording guided fluid waves transmitted circumferentially about the borehole wall.

Another object of the invention is to provide novel electrical circuitry by which only one transmitter may become operative during any one time period.

Still another object of the invention is to provide novel electrical circuitry whereby parts of each or all of the shear waves and compressional waves resulting from each acoustic wave produced may be recorded for interpretation.

SUMMARY OF THE INVENTION

The present invention attains the above objectives by providing a circumferential acoustic logging system which utilizes a plurality of transducers functioning as transmitters and receivers to transmit short bursts of acoustic energy into the well fluid and the formation surrounding a wellbore and to receive the resultant acoustic waves after they have travelled in the formation and well fluid in the form of shear waves and compressional waves. The transducers are mounted on long, extendable arms of the logging tool and are arranged circumferentially in a plane which is perpendicular to the borehole. The arms may be mechanically extended so that the transducers are placed in close proximity with the wall of the borehole to insure proper transmission and reception of the acoustic waves. The transducers are so constructed that circumferentially travelling waves are propagated which allow the detection of vertical fractures and anomalies in the underground formations. The mechanical design of the novel acoustic logging device and the design of the transducers has been fully set forth in U.S. Pat. No. 4,130,816, issued to Charles B. Vogel, et al.

At least two transmitters and two receivers mounted on the logging tool are arranged alternately about the circumference of the borehole so that four transmission paths are formed which define the circumference of the borehole. During one measurement cycle, acoustic energy is transmitted over each of these transmission paths in a predetermined order. A wave generator is utilized to synchronize the operation of the transmitters and receivers, and four distinct measurement intervals result during each measurement cycle. For instance, during the period of operation of the first receiver, the first and second transmitters are alternately actuated in succession, thus transmitting acoustic energy over two of the transmission paths, and during the period of operation of the second receiver, the first and second transmitters again are alternately actuated in succession, thus transmitting acoustic energy over the remaining two transmission paths. Hence, the acoustic waves received and transmitted to the surface substantially completely traverse the circumference of the borehole at a particular depth. Actuation of a transmitter out of sequence due to cross-coupling of electrical signals is prevented by a novel latching circuit associated with each transmitter which insures that, while one transmitter is actuated and during a short time interval immediately following its actuation, no other transmitter may become actuated. The acoustic waves that arrive at the receivers are converted to their electrical equivalents and transmitted to the surface where the signals are processed. Improved electronic circuitry at the surface allows selective recording and display of the shear waves and compressional waves comprising the acoustic waves. A novel delay circuit is provided to allow selective recording of the entire shear wave to the complete exclusion of any later arriving wave, since the shear wave is particularly sensitive to vertical fractures and anomalies in the formation through which the wave is propagated.

To facilitate the location of vertical fractures and anomalies, electronic circuitry may further process the shear waves for each of the four transmission paths, so that a single indication of presence or absence of a vertical fracture may be computed for each particular measurement cycle.

BRIEF DESCRIPTION OF THE DRAWINGS

The invention and its objects, features and advantages may be more easily understood from the following detailed description when taken in conjunction with the accompanying drawing in which:

FIGS. 2a and 2b illustrate the circumferential acoustic well logging tool according to the invention in a position in a well bore including, in block diagram form, the electronic circuitry in the surface and subsurface equipment.

FIG. 5 is a circuit diagram of a portion of the surface electronic equipment, including the details of the demultiplexer pulse generator and the window trigger generator.

FIGS. 6a and 6b is a circuit diagram of a portion of the surface electronic equipment, including the details of the acoustic signal processor and the window, caliper and velocity signal generator.

FIG. 13 is a representation of a guided fluid wave recording and a shear wave recording made utilizing the invention.

DESCRIPTION OF THE PREFERRED EMBODIMENT

Figure 1:
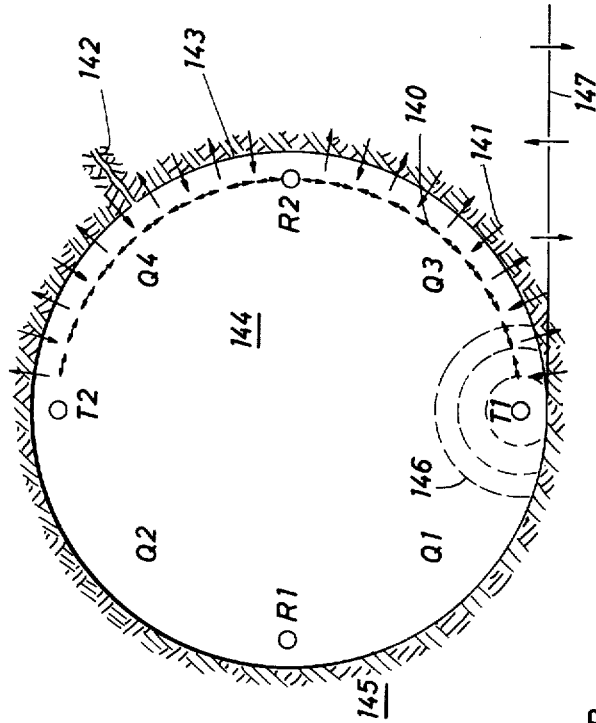
FIG. 1 is a cross-section of a typical borehole showing a representative spacing of the transmitters and receivers of the invention.

Referring to FIG. 1, there is shown a cross-sectional view of a typical borehole with the transmitters and receivers of the invention in place adjacent the borehole wall. The transmitters radiate compressional wave acoustic energy 146 of an onmidirectional character in the azimuthal direction into the well fluid filling the borehole. Thus, appreciable energy is radiated in the directions of the critical angles of refraction so that the compressional wave in the fluid impinges on the borehole wall so as to produce shear waves in the formation 145. The transmitters and receivers alternately placed about the circumference of the borehole define four quadrant paths Q1, Q2, Q3 and Q4 along which the acoustic energy is transmitted. The transmitters and receivers are sequentially switched so that each transmitter-receiver pair becomes operative during each measurement cycle. The acoustic waves that are developed in the formation 145 by the propagation of acoustic energy from transmitters T1 or T2 are broadly classified as shear waves and compressional waves. However, experimentation has indicated that these waves may be further classified by their order of appearance at the receiver of the transmitter-receiver pair which is operative at the particular time. The first-arriving wave is a compressional wave which has been propagated through the formation. This compressional rock wave, as it is referred to, is of such small amplitude that it contributes negligibly to the amplitude of the received signal. The next-arriving wave is a wave which has travelled as a compressional wave from the transmitter through the well fluid, thence along the borehole wall as a refracted, diffracted shear wave 141, thence to the receiver as a compressional wave in the fluid. The path 147 indicates the direction of travel of shear wave 141 as dictated by Snell's Law. However, the arcuate nature of the borehole wall 143 causes a circumferential propagation. Because the wave length of the refracted shear wave is relatively long, for example one inch, the wave spreads sufficiently to provide appreciable detectable energy along this circumferential path. The third wave to arrive is a compressional wave that is thought to travel directly through the borehole fluid to the receiver, which is designated a direct fluid wave. The fourth wave identified at the receiver is a compressional wave 140 propagated along the wall 143 with a velocity approximately equal to the propagation velocity of the well fluid. Transmission of this compressional "guided fluid" wave 140 and the shear wave 141 are impaired by an open fracture 142. In the case of shear wave 141, the fact that the fracture is filled with wellbore fluids does not significantly affect the degree of attenuation. However, the guided fluid wave 140 exhibits a high degree of attenuation when travelling along the wall past a fluid filled fracture only if the fracture is of sufficient width to cause "leakage" of the wave pressure into the open fracture. Hence, the shear wave 141 and the guided fluid wave 140 are of particular significance in determining the presence of vertical fractures, while the intermediately arriving direct fluid wave is not essential to this objective.

Figure 2B:
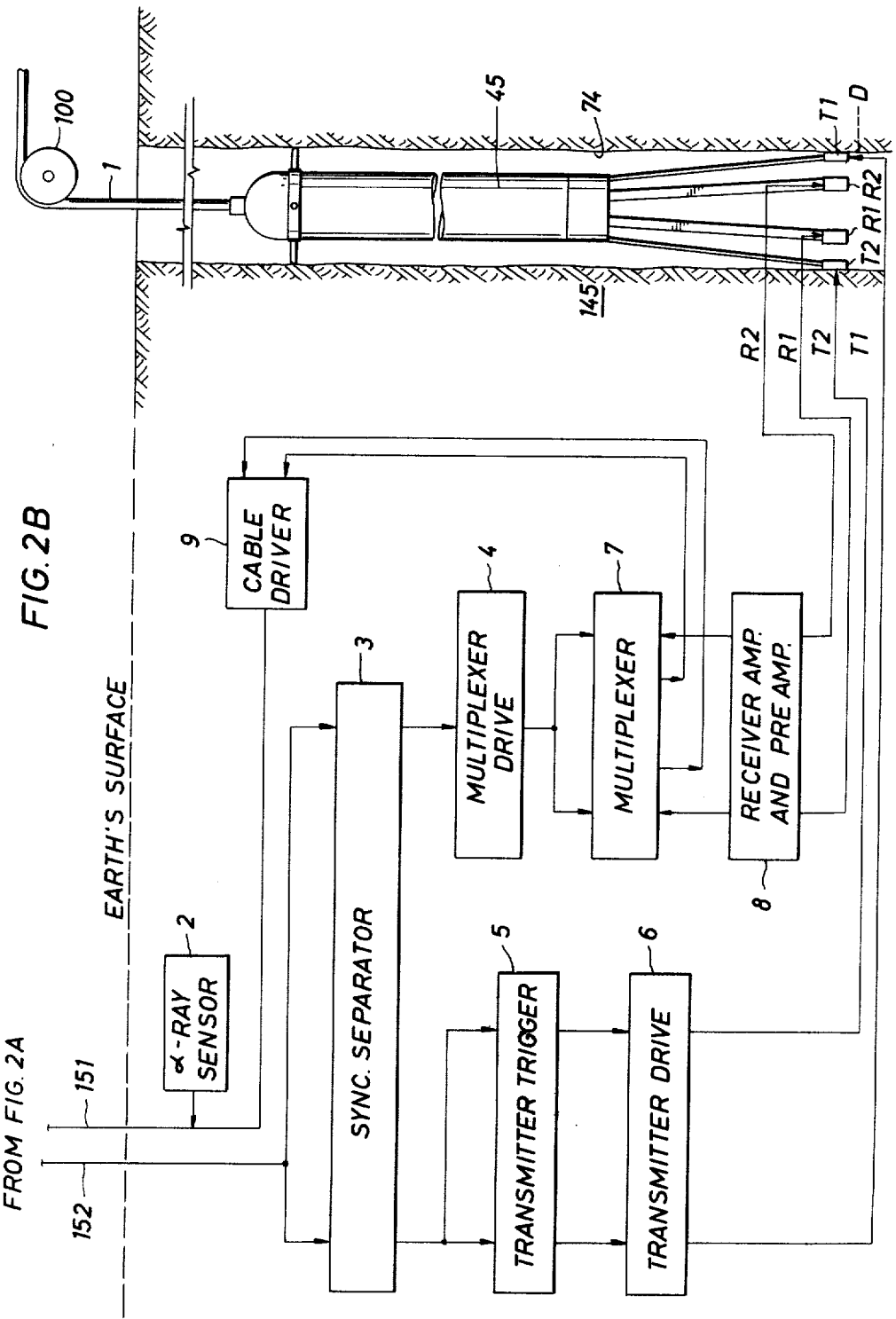

Referring now to FIGS. 2a and 2b, the surface electronic equipment and subsurface electronic equipment of the invention are shown in block form, separated by the dashed line designating the earth's surface and interconnected by cable 1 and the plurality of conductors 151 and 152. The logging tool 45 is suspended in borehole 74 by way of suspension cable 1. The logging tool includes two acoustic energy transmitters T1 and T2 and two acoustic wave receivers R1 and R2 disposed in a path concentric with the wall of borehole 74. The transmitters and receivers are spaced alternately at 90-degree intervals about the circumference so as to form four separate transmission paths, as previously mentioned in FIG. 1. In accordance with the invention, one or more of a plurality of measurements between transmitters and receivers in the logging tool are taken during a complete measurement cycle. With the transmitter-receiver arrangement shown, four separate measurement intervals are possible during the measurement cycle, one for each quadrant Q1-Q4 as indicated in FIG. 1. Quadrant Q1 of FIG. 1 represents the path taken during actuation of T1-R1, Q2 represents the path taken during actuation of T2-R1, Q3, the path during actuation of T1-R2, and Q4, the path during actuation of T2-R2. It is therefore apparent that, during any measurement cycle, measurements are made which may completely define the circumference of the borehole. Because of the attenuation of the circumferentially propagated shear waves by the presence of vertical fractures in the surrounding formations, such a vertical fracture at any depth at which the circumferential acoustic logging system is operative may be detected.

The cable 1 is of the armored type, extending from the upper end of the tool to the surface of the earth. The cable is spooled on a winch 100 known in the art, operation of which serves to raise and lower the tool through the wellbore. Known depth measuring means, not shown, are provided to indicate tool depth. Cable 1 may contain a plurality of conductors 151 and 152 for providing conducting paths for electrical signals between the surface equipment and the subsurface apparatus, as well as to supply electrical power from a power source at the earth's surface to the subsurface apparatus.

Overall system synchronization is provided by a wave generating source comprised of an alternating wave generator 20 and a synchronizing pulse generator 21. The power for the wave generating source may be commercially supplied or from separate generators. Power is conducted from its source at the surface to the surface equipment, and via suitable conductors 152 in cable 1 to the subsurface equipment.

Alternating wave generator 20 provides a reference frequency for selecting the proper transmitter-receiver pairs during each measurement interval of a measurement cycle. The alternating wave frequency is chosen to provide measurement intervals of sufficient duration to allow adequate time for transmission to the surface of the received acoustic waves. For instance, a 50 c.p.s. sine wave provides a measurement cycle of 20 ms., the duration of one period of the sine wave. For the transmitter-receiver arrangement shown, this measurement cycle is further subdivided so that four 5 ms. time periods result, a single measurement interval occurring during each 5 ms. period. Synchronizing pulse generator 21 takes the sine wave from generator 20 as its input to produce at its output a series of pulses in synchronization with the 50 c.p.s. sine wave. If receiver R1 is actuated during the positive half cycle of the sine wave, and R2 is actuated during the negative half cycle, pulse generator 21 may then be used to synchronize the operation of the transmitters with the operation of the receivers by producing a train of alternating positive and negative-going pulses. Two pulses, a positive and a negative-going pulse, are produced each half-cycle of the sine wave. The positive-going pulse may be used to actuate transmitter T1 and the negative-going pulse may be used to actuate transmitter T2. The synchronizing pulses are spaced at 5 ms. intervals so that each pulse initiates a measurement interval, resulting in four measurement intervals per measurement cycle. The transmitter-receiver pair for each quadrant is therefore operated once during a complete measurement cycle. The center frequency for the synchronizing pulses is chosen sufficiently high so that several cycles of the shear wave may be received before the arrival of the guided fluid wave. For borehole diameters greater than eight inches and for rock p-wave velocities exceeding 20,000 ft/sec., 129 kHz is a good frequency. For larger borehole diameters, better results will be obtained at a lower frequency. For small diameters or lower rock velocities, a higher frequency would be desirable.

Electrical equivalents of the acoustic waves received at receivers R1 and R2 are transmitted to the surface via one of the conductors in the group of conductors 151. These electrical equivalents are supplied to an acoustic signal processor 50 for processing and to an analog tape transport 85. The tape transport records the received electrical signals, for instance on magnetic tape, for later analysis of the data received. The first stage of the acoustic signal processor 50, the acoustic signal amplifier and pre-amplifier 28 is continuously responsive to the electrical equivalents received from the sub-surface equipment. The electrical equivalents are subsequently passed through a delay circuit 30 switchedly connected to the amplifier and pre-amplifier 28, the delay circuit being utilized to process the shear wave signal to the exclusion of later arriving waves during a single measurement interval. The delay circuit of the invention is utilized in a novel way to allow selection of the complete shear wave signal in each instance. Prior art systems have used delay circuits or similar concepts to interpose a fixed time delay usually based on the average velocity of an acoustic wave through the medium of interest to either initiate or terminate the recording of a particular acoustic wave. For instance, in U.S. Pat. No. 2,691,422, means were used to block the acoustic wave from further processing after a fixed period of time based on the average velocity of a compressional wave in the borehole media. In general, the prior art systems have relied on this average velocity concept which often introduces erroneous data due to inherent variations in the acoustic wave velocities. As will be explained more fully in the detailed circuit description following, the concept being used in the present invention is a different one altogether.

The next component of interest in the acoustic signal processor 50 is window switch 41, made operative by window, caliper, and velocity signal generator 80 which insures that only the signals of interest for detection of vertical fractures during the particular measurement interval are further processed by processor 50. Window, caliper, and velocity signal generator 80 operates in synchronization with the alternating wave from generator 20 and the synchronizing pulses from pulse generator 21 to provide the proper period of operation for switch 41. The portion of the signal that is passed by switch 41 is further processed by rectifier 46, peak detector 49, and sampling switches 51 so that chart recorder 60 receives a single interpretable signal for each measurement interval of a measurement cycle.

Demultiplexer pulse generator 65 and window trigger generator 75 provide outputs in the form of electrical pulses of predetermined duration which are supplied to window, caliper, and velocity signal generator 80 which provides "gating" pulses for the operation of switch 41. Generator 65 uses as its input the sine wave from alternating wave generator 20 to divide the half-cycle of the sine wave into two parts of pre-determined duration. Trigger generator 75 uses as its input the series of pulses from pulse generator 21 to provide a train of electrical pulses of longer duration, which pulses are used for the initiation of the measurement intervals which occur during a measurement cycle.

After the electrical equivalents of the received acoustic waves are fully processed, the resultant electrical response may be displayed in various ways. Multichannel chart recorder 60 allows separate display of the processed electrical response of each measurement interval, so that each quadrant of the wall of the borehole which was traversed during the measurement cycle is represented. In addition, since all unprocessed signals have been recorded by the analog tape transport 85, visual display of the complete waveform received during each measurement interval is possible by playback of the recorded signals over the appropriate equipment, such as multichannel chart recorder. Various conventional means may also be used to compute a single signal such as a minimum peak signal from the four measurement intervals of a measurement cycle to be displayed versus depth on a conventional well log, the peak signal being indicative of the presence or absence of a vertical fracture at the depth recorded. Likewise, an average of the peak signals of the four measurement intervals may be computed and displayed on a conventional well log. A particularly useful means of displaying the processed electrical responses involves the production of a well log for each quadrant being investigated. FIG. 13 indicates the responses from quadrants Q1, Q2, Q3 and Q4 of a typical well over approximately 100 feet of the borehole depth. Parts a, b, c and d represent the peak amplitude of the shear wave received for quadrants Q1, Q2, Q3 and Q4, respectively, displayed versus depth. Parts e, f, g and h represent the peak amplitude of the guided fluid wave received for quadrants Q1, Q2, Q3 and Q4, respectively, displayed versus depth for the same 100-foot interval. Each measurement cycle would correspond to a single point, such as is shown at P in parts a through h. A succession of the amplitudes at each such point results in the well logs as shown. When the amplitude decreases at a certain point, such as at A, B, C, D or E, vertical fracturing at that point is indicated. These deflectons appear differently in quadrants Q1 through Q4 and exhibit sufficient vertical continuity not to be produced by noise. Sharpness of the deflections indicates a high degree of vertical resolution. It may be noted that both the guided fluid wave response and the shear wave response exhibit deflections of a decreasing amplitude at the same points of the respective quadrants. This is further indication of the system's ability to detect vertical fractures accurately.

Referring again to FIGS. 2a and 2b, the 50 c.p.s. sine wave and the series of alternating positive and negative-going pulses supplied by generators 20 and 21 may be conducted via a single conductor in the group of conductors 152 to operate the sub-surface equipment located below the dashed line, which subsurface equipment is housed within the logging tool 45. Alternatively, the since wave and series of pulses may be supplied via separate conductors. If supplied by a single conductor, separating means such as a separator circuit 3 may be used to separate the signals downhole so that the sine wave may be supplied to the receiver circuitry and the series of synchronizing pulses may be supplied to the transmitter circuitry. This separator circuit may be a combination of well known low pass filter and high pass filter circuits whose function is to filter out any high frequency components of the sine wave signal which is sent to receivers R1 and R2 and to filter out any low frequency components of the train of pulses sent to transmitters T1 and T2. Because of crossfeed normally encountered in multiconductor cables, even if the respective signals are transmitted downhole by separate conductors, a separator circuit 3 is still necessary. Controlling means for selectively actuating the transmitters and receivers comprises separator circuit 3 and the following transmitter and receiver circuitry.

The transmitter circuitry is comprised of a transmitter trigger 5 and a transmitter drive 6. Trigger circuit 5 receives and separates the positive-and negative-going pulses thus controlling the selective actuation of transmitters T1 and T2. The positive-going pulses are utilized to actuate transmitter T1 and the negative-going pulses are utilized to actuate transmitter T2. Drive 6 is comprised of two cross-coupled circuits, one for each transmitter, each of which acts to fire the respective transmitter upon receipt of the proper synchronizing pulse. A novel latching circuit is incorporated into the transmitter drive 6 to prevent the erroneous firing, such as by signals cross-coupled from one conductor to another, of any other transmitter while one is actuated.

This inoperative period begins at the instant of firing of a first transmitter and continues for a pre-determined period approximately the duration of a measurement interval.

The receiver circuitry is comprised of a multiplexer drive 4, a multiplexer 7, a receiver amplifier and preamplifier 8, and a cable driver 9. The receivers R1 and R2 each are provided with separate amplifying means incorporated in amplifier and preamplifier 8, whereby the acoustic wave received by the receiver and connected to its electrical equivalent is amplified for transmission to the surface equipment. Multiplexer 7 acts as a selector to select the proper receiver for the respective measurements intervals. As previously discussed, receiver R1 is actuated during the positive half-cycle of the sine wave and receiver R2 is actuated during the negative half-cycle. The sine wave is supplied to multiplexer drive 4, which in turn controls multiplexer 7 in selectively actuating one of receivers R1 or R2. The respective electrical equivalents of the acoustic waves are transmitted by multiplexer 7 to a cable driver 9, which further amplifies the signals and transmits them to the surface equipment. It is understood, of course, that the selected receiver in logging tool 45 converts the incident acoustic wave into electrical signals having waveforms representative of such acoustic waves in a conventional manner.

To illustrate the operation of the overall system, assume that it is desired to make a recording of the wall of the borehole at depth D in FIG. 2b. Four individual measurements will be taken, a measurement interval for each quadrant Q1–Q4 as shown in FIG. 1.

Upon receipt of the first half-cycle of the sine wave supplied by generator 20 at multiplexer drive 4, multiplexer 7 becomes operative for receipt of an electrical signal from receiver R1 and remains operative throughout the first half-cycle. After a pre-determined time interval, a positive-going pulse supplied by synchronization pulse generator 21 is transmitted to transmitter trigger 5 which senses the positive-going pulse and transmits it to the circuit associated with transmitter T1 in transmitter trigger 6. The transmitter is selectively and momentarily actuated by trigger 6 so that a pulse of acoustic energy is transmitted about an arcuate path surrounding the well bore. At the same time, the latching circuit prevents the actuation of any other transmitter for a pre-determined time interval. As the acoustic wave propagated about the circumferential path over quadrant Q1 is received at receiver R1, the wave is converted into its electrical equivalent and the variations in acoustic energy amplitude are transmitted by cable driver 9 to the surface equipment. There, a waveform of the type shown in FIG. 3a appears at the input to acoustic signal processor 50 for further processing. A marking pulse 160 is included in the waveform for the purpose of indicating the time of production of the synchronization pulse. Indirectly, this pulse also indicates the time of firing of the transmitter, which occurs after a predetermined and known time interval about 100 microseconds following the production of the synchronization pulse. This time interval is a system delay comprising the travel time of the synchronization pulse from the surface down the cable to the transmitter trigger, plus the response time of the trigger. This complete operation occurs prior to the receipt of the first negative-going pulse from generator 21.

The operation is repeated upon receipt by transmitter trigger 5 of the first negative-going pulse from generator 21, which occurs approximately 5 ms. after the positive-going pulse. Transmitter T2 becomes actuated by transmitter trigger 5 and transmitter drive 6 to transmit a pulse of acoustic energy into the formation, and transmitter T1 is prevented from becoming actuated by the latching circuit. Receiver R1 is still in an operative state, since the second synchronizing pulse occurs during the positive half-cycle of the sine wave. The acoustic wave received at receiver R1 from transmitter T2 is converted to its electrical equivalent and transmitted to the surface, providing the sigal from quadrant Q2.

Upon receipt by the multiplexer drive 4 of the negative half-cycle of the sine wave, receiver R1 is rendered inopertive and R2 becomes actuated. In a like manner as described above, transmitters T1 and T2 are momentarily and successively actuated by the positive-and negative-going pulses from generator 21, so that receiver R2 provides signals from quadrants Q3 and Q4.

At the surface, as each respective signal is received for the particular measurement interval, it is processed by acoustic signal processor 50 as controlled by demultiplexer pulse generator 65, window trigger generator 75, and window, caliper, and velocity signal generator 80. During this time, the logging tool has moved uphole to a different position along the wall of the borehole. It will be seen then that as the tool moves through the borehole, successive measurement cycles each with four separate measurement intervals are completed, thus resulting in a recording of any vertical fractures or anomalies present in the logged portion of the borehole.

The details of the individual components of the system shown broadly in FIGS. 2a and 2b will now be described.

Alternating Wave Generator 20 and Synchronizing Pulse Generator 21

Figure 4:
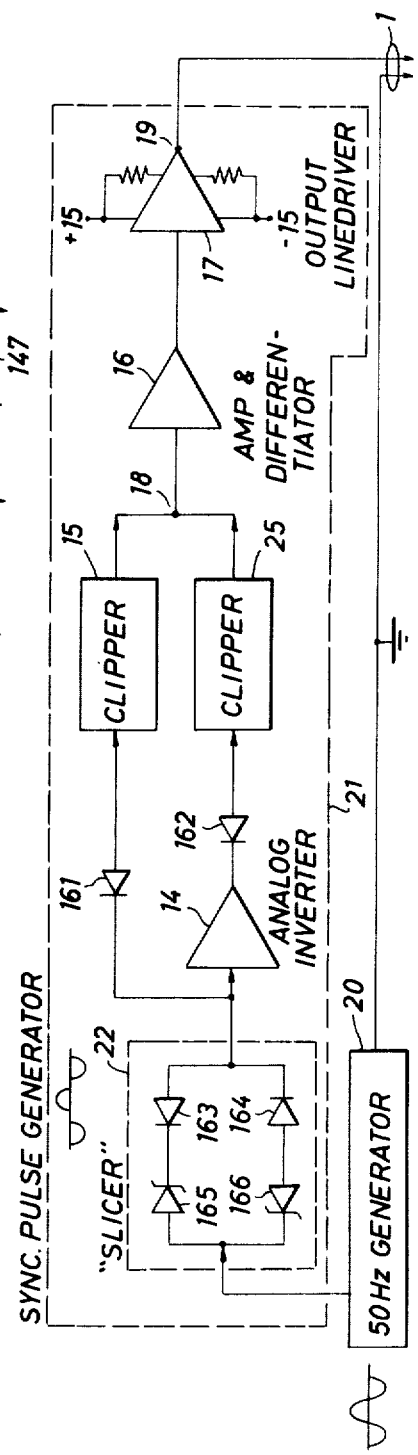
FIG. 4 is a circuit diagram of the synchronizing wave generator, a component of the surface electronic equipment.
Figure 11:
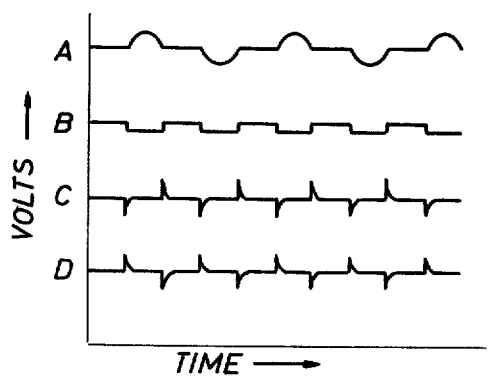
FIG. 11 is a series of waveforms which are helpful in explaining the operation of the synchronizing wave generator.

A wave generating source comprised of alternating wave generator 20 and synchronizing pulse generator 21 is used to synchronize overall system operation. The alternating wave generator may be any of several types well known in the art, such as a 50 c.p.s. sine wave generator which derives its power from a commercial source or a power generator. Pulse generator 21 is shown in schematic form in FIG. 4. Input is provided by a 50 c.p.s. generator 20. Referring to FIG. 4, slicer 22, comprised of zener diodes 165 and 166 and diodes 163 and 164, provides waveform A as shown in FIG. 11. As the input sine wave increases in a positive direction, diode 163 prevents passage of the signal to the output of slicer 22. However, at the point the sine wave signal reaches a level equal to the breadkdown voltage of zener diode 166, diode 164 allows transmission of the remaining portion of the positive half-cycle of the sine wave signal, at least until the signal level again falls below the zener breakdown voltage. As the sine wave begins its negative half-cycle, diode 164 blocks passage of the signal, but zener diode 165 allows transmission of the negative half-cycle of the sine wave signal after it has become sufficiently negative to exceed the zener breakdown voltage. When the negative half-cycle approaches a zero level, the zener breakdown threshold is again reached and transmission by diode 163 is prevented. The negative portion of this 'sliced' sine wave A of FIG. 11 is separated by diode 161 and transmitted through clipper 15 where that portion of the sine wave is converted into a square pulse in a conventional fashion. Waveform A in its entirety is passed through inverter 14 where an exact inverse of waveform A is produced. Diode 162 allows transmission of only the negative portion which was prevented from being transmitted by diode 161. This negative portion is converted into a series of square pulses by clipper 25 in a conventional manner, and the outputs of clipper 15 and clipper 25 are added at point 18 of pulse generator 21, resulting in waveform B of FIG. 11. Amplifier and differentiator 16 reduces the series of square pulses to a series of synchronizing pulses (waveform C, FIG. 11) by differentiating the square pulse train. This series of pulses is then amplified and converted into pulse train D of FIG. 11 by line driver 17 for transmission to the surface and subsurface equipment of the invention. The zener diodes are chosen so that the breakdown voltages effectively separate the resultant positive-and negative-going pulses of the series of pulses by approximately 5 ms. for a sine wave period of 20 ms. Thus, approximately 2.5 ms. after the initiation of the positive half-cycle of the 20 ms. sine wave, a positive-going pulse appears at the output of pulse generator 21. Approximately 5 ms. later, a negative-going pulse appears. After another 5 ms., another positive-going pulse appears, and so on. The pulses derived from generator 21 serve to synchronize the operation of the transmitters with the operation of the receivers, insuring continuous and accurate timing.

The pulse separation times may be controlled by proper choice of zener diodes 165 and 166. Choice of the zener diodes based on the breakdown voltages will effectively change the duration elapsing between the pulses to provide the desired firing times for the transmitters. For the waveforms of FIG. 11, the pulse rate frequency is approximately 200 pulses per second.

Demultiplexer Pulse Generator 65

Figure 12:
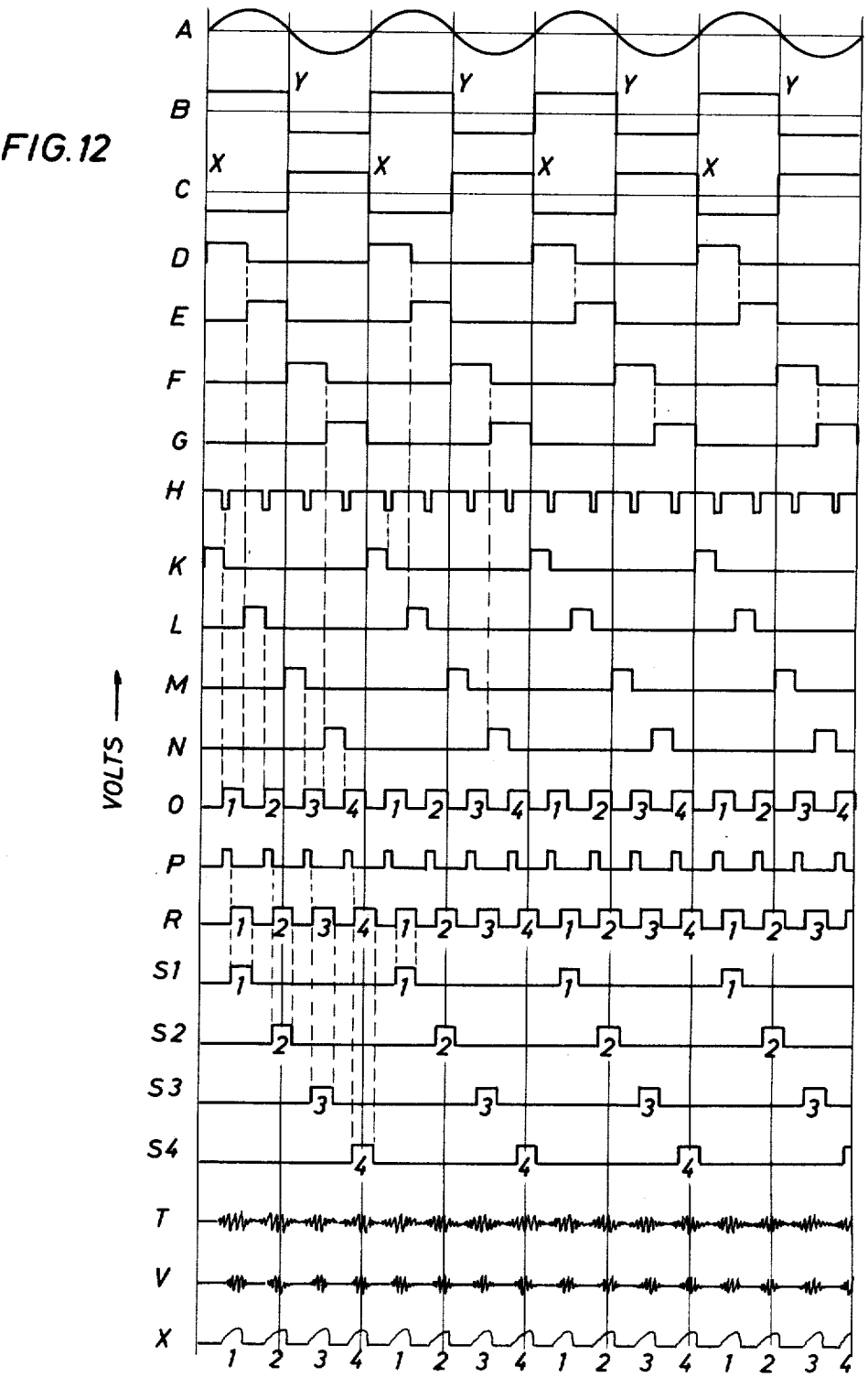
FIG. 12 is a series of waveforms which are generated at various stages of operation of the system of the invention.

Demultiplexer pulse generator 65, shown in block form for its relationship with the system of the invention in FIG. 2, is shown in greater detail in FIG. 5. As illustrated therein, generator 65 comprises a low pass filter 66, a comparator 67, an inverter 68, monostable multivibrators or single shots 70 and 72, and flip flops 71 and 73. All waveforms to which reference is hereafter made will appear in FIG. 12, unless otherwise noted.

Low pass filter 66 receives as its input a sine wave A, for instance of 50 c.p.s., and removes any spurious high frequency signals superimposed on the sine wave. Comparator 67 generates alternating square waveform B by providing a positive potential of a predetermined level when the sine wave is positive and a potential that is negative relative to the positive potential when the sine wave signal is negative. Square wave signal B becomes the "CL" input for flip-flop 71, which is an asynchronous input not dependent on the clock, or "CK", input state of the flip-flop. Inverter 68 inverts the positive and negative square pulses shown in waveform B so that the exact opposite of waveform B is supplied as the input to single shot 70 and the "CL" input to flip-flop 73. It is, of course, understood that although the signals are referred to as positive and negative in the following discussion, neither signal becomes negative with respect to ground potential, since the particular binary devices used would cease to function if a potential less than ground potential appeared at an input. Hence, a signal is negative only relative to the corresponding positive signal. Single shot 70 functions in the conventional manner, providing a pulse output of predetermined duration at its Q output and the inverse of that pulse at its $\overline{Q}$ output, which inverted pulse becomes the "CK" input for flip-flop 71. Single shot 70 triggers to provide its pulse output on the negative-going edge of the square output waveform C of inverter 68. Thus, at each point X of waveform C, a pulse of predetermined width (waveform D) appears at output Q of single shot 70. The Q output is connected to window trigger generator 75 for purposes which will be explained later. Flip-flop 71 operates to change its state via its own Q output from a negative sense to a positive sense upon receipt at its "CK" input of the positive-going edge of the $\overline{Q}$ output from a single shot 70. Since the $\overline{Q}$ output of single shot 70 is the inverse of waveform D, each time waveform D goes negative (its inverse goes positive) the flip-flop 71 generates a positive waveform E at its own Q output. This positive signal continues at the Q output until a negative-going signal appears at the "CL" input of flip-flop 71. Since the signal at the "CL" input is output waveform B of comparator 67, a negative-going edge occurs at each point Y. Thus, the output Q of flip-flop 71 reverts to a low voltage level at each point Y of waveform B. It is apparent then, that the joint actions of single shot 70 and flip-flop 71 divide the time period of the positive half-cycle of sine wave A into two portions, the first being while the Q output of single shot 70 is at a high voltage level, the second being while the Q output of the flip-flop 71 is at a high level. It should be understood that the time of termination of the square pulse from single shot 70, and hence the time of initiation of the square pulse from flip-flop 71 may be varied by choosing a single shot 70 with a different period of operation. However, the time of initiation of single shot 70 and the time of termination of flip-flop 71 are controlled by the time period of the first half-cycle of the sine wave.

The Q output of flip-flop 71 is connected to the input of single shot 72 and to the window trigger generator 75, the function of which will be explained later. Single shot 72 is preferably chosen to have the same period of operation as single shot 70, for reasons which will become apparent. Upon sensing the negative-going edge of waveform E at its input, single shot 72 generates positive signals in the form of waveform F at its Q output which is transmitted to window trigger generator 75. The inverse of waveform F appears at its $\overline{Q}$ output which is connected to the "CK" input of flip-flop 73. Since flip-flop 73 changes state from a negative level to a positive level upon sensing the positive-going edge of a signal at its "CK" input, this occurs when waveform F has a negative-going edge. Thus, when output Q of a single shot 72 drops to a negative level, its $\overline{Q}$ output rises to a positive level, and flip-flop 73 changes state to a positive level upon receipt of the positive-going edge. In the same manner as explained above regarding flip-flop 71, when a negative-going edge of a signal appears at the "CL" input of flip-flop 73, output Q drops to its negative state. Since the "CL" input receives its signal from the output of inverter 68 (waveform C), flip-flop 73 drops its negative level at each point X of the waveform, resulting in a signal such as waveform G at its Q output.

Hence, the effect of single shot 72 and flip-flop 73 is the same as to the time period of the negative-going half cycle of sine wave A as the effect of single shot 70 and flip-flop 71 is to the positive half-cycle. If the periods of operation at a positive level of single shots 70 and 72 are chosen to be equal, the periods of operation of flip-flops 71 and 73 will be equal since each of the flip-flops drops back to a low level at the end of the respective half-cycle of sine wave A. The total effect of demultiplexer 65 is to divide one full cycle of sine wave A into four not necessarily equal parts, as exemplified in FIG. 12, waveforms D, E, F, G. These output waveforms, in addition to being transmitted to window, caliper, and velocity signal generator 80 for purposes which will be later explained.

Window Trigger Generator 75

Window trigger generator 75 is shown in detailed schematic form in FIG. 5. Generator 75 comprises a high pass filter 76, a full wave detector 90, an inverter 113, four flip-flops 105, 106, 107 and 108, and four inverters 109, 110, 111 and 112.

Synchronization pulse generator 21 supplies the series of alternating positive-and negative-going pulses to the input of generator 75. High pass filter 76 receives this series of pulses at its input, each pulse having a center frequency of approximately 120 kHz as previously explained, and filters out any lower frequency signals before transmitting the pulses to full wave detector 90. Full wave detector 90, operation of which will be explained in greater detail following this discussion, generates a series of pulses of short duration, each pulse being initiated by a positive or negative pulse at its input, and each pulse of detector 90 being in the positive sense. Hence, a series of positive-going pulses separated by approximately 5 ms. results at the output of detector 90. These pulses are in turn inverted by inverter 113 so that at point 75A of FIG. 5, the output of inverter 113, waveform H results. This signal is connected to each of the asynchronous "CL" inputs of flip-flops 105, 106, 107 and 108, which flip-flops function in the same manner as the flip-flops of demultiplexer pulse generator 65. In other words, when a negative-going signal appears at any of the "CL" inputs, a positive state on output Q of any of the flip-flops changes to a negative state. As indicated in FIG. 5, the "CK" input of each flip-flop of window trigger generator 75 is supplied by one of the Q outputs of the single shot and flip-flop circuits of demultiplexer pulse generator 65. Single shot 70 supplies the "CK" input (wave-form D) to flip-flop 105, flip-flop 71 supplies the "CK" input (waveform E) to flip-flop 106, single shot 72 supplies the "CK" input (waveform F) to flip-flop 107, and flip-flop 73 supplies the "CK" input (waveform G) to flip-flop 108.

Since the operation of each of the flip-flops of generator 75 is identical, only the operation of flip-flop 105 will be explained in detail. Flip-flop 105 changes from a negative to a positive state at the instant a positive-going signal appears at its "CK" input. Referring to waveform D, this occurs on the leading edge of each pulse of the square pulse train shown. However, upon receipt of the negative-going edge of a signal represented by waveform H at its "CL" input, flip-flop 105 reverts to a negative state, resulting in the appearance of waveform K at its Q output. In like manner, waveform L, M and N result at the Q outputs of flip-flops 106, 107 and 108, respectively. Each of these outputs is initiated by the leading edge of the Q outputs from demultiplexer pulse generator 65 and is terminated by the negative-going edge of the series of pulses of waveform H. The Q outputs of flip-flops 105, 106, 107 and 108 are inverted by inverters 109, 110, 111 and 112, respectively, and combined at point 112A of FIG. 5. The resultant waveform O, a series of square pulses each beginning at the same instant as one of the pulses of waveform H, appears in FIG. 12. It should be noted that, although the initiation of each of the pulses of waveform O is coincident with one of the synchronizing pulses, the time of termination at least of the first pulse to appear in each half-cycle of waveform A may be varied by varying the periods of operation of single shots 70 and 72 of generator 65. From this point, for purposes of explanation, the pulses appearing in waveform D during the positive half-cycle of waveform A will be designated pulses 1 and 2, respectively, and those appearing during the negative half-cycle will be designated pulses 3 and 4, respectively.

Figure 7:
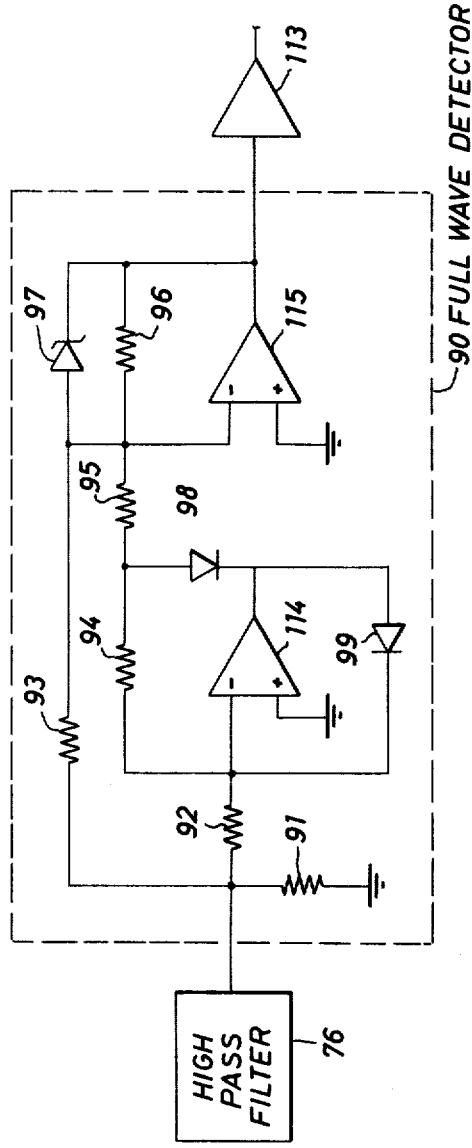
FIG. 7 is a circuit diagram of the full wave detector, which is a component of the window trigger generator.

Full wave detector 90 is shown in FIG. 7. In that figure, operational amplifier 114 serves as an inverting stage with low gain, and acts as a precision full wave rectifier because of the presence of the two diodes 98 and 99. Diode 99 causes the gain of amplifier 114 to be zero for negative input at the inverting input point. Diode 98 and resistors 92 and 94 cause a positive input to be amplified with a gain of approximately unity. The output of amplifier 114 is applied to the inverting input of amplifier 115 in which the output is clipped to a value equal to the zener voltage of zener diode 97. Resistor 96 causes the gain of amplifier 115 to be a constant value below the clipping level. At the clipping level the gain becomes unity. The resistor 93 improves the waveform. Thus, the output of amplifier 115 is a series of constant amplitude positive pulses, even if the input varies.

The signal at point 112A of FIG. 5 consisting of the cycle of pulses 1-4 is transmitted to window, caliper, and velocity signal generator 80, which will be explained now, and wherein the importance of waveform O will become apparent.

Window, Caliper and Velocity Signal Generator 80

Figure 6A:
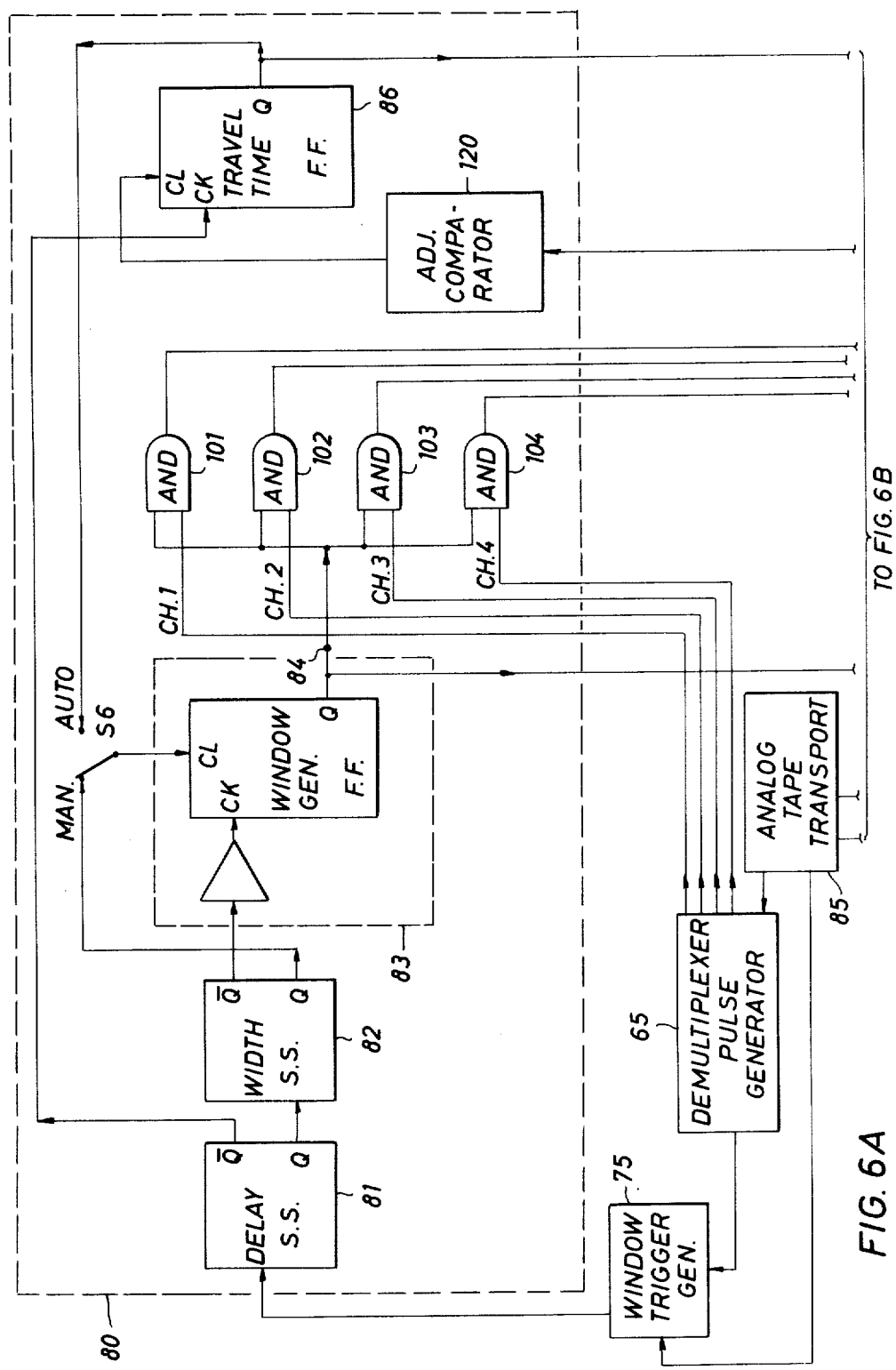

Referring to FIGS. 6a and 6b, window, caliper, and velocity signal generator 80 is shown in detailed form. Generator 80 comprises a window delay single shot 81, a window width single shot 82, window generator flip-flop 83, AND gates 101, 102, 103 and 104, adjustable comparator 120 and travel time flip-flop 86.

Generator 80 takes as its input a signal which is represented by waveform O from window trigger generator 75. This series of pulses causes delay single shot 81 to generate a second series of pulses, the duration of each pulse being variable by varying a controlling potentimeter associated with single shot 81. The leading edge of each pulse of the cycle of pulses 1-4 as shown in waveform O trigger single shot 81 so that the initiation of a pulse at output Q of single shot 81 occurs simultaneously. For purposes of the following discussion, output Q of single shot 81 will be represented by waveform P of FIG. 12, keeping in mind that the duration of each pulse is variable. Output of single shot 81 is connected to the input of window width single shot 82, another single shot whose pulse width may be varied by varying a potentimeter connected thereto. However, single shot 82 triggers to produce a pulse upon sensing a negative-going edge at its input. Hence, when one of the pulses of waveform P drops to a low level, single shot 82 generates a pulse at its Q output. At the same time, the $\overline{Q}$ output of single shot 82, which was previously at a high level, drops to a low level. This $\overline{Q}$ output is inverted and connected to the "CK" input of window generator flip-flop 83. At this point, it becomes necessary to discuss two modes of system operation; manual and automatic. Switch S6, which has a "Man" and an "Auto" setting, determines which signal will be connected to the "CL" asynchronous input of flip-flop 83. In the "Man" setting, a pulse appearing at the Q output of flip-flop 83 is terminated at the instant a negative-going signal appears at the "CL" input, which occurs when the Q output of single shot 82 drops to a low level. It is apparent then, that in the manual switching mode, window generator flip-flop 83 merely follows single shot 82. At the instant a positive-going pulse appears at its "CK" input, flip-flop 83 generates a positive pulse at its Q output. This occurs when a negative-going signal appears at the $\overline{Q}$ output of single shot 82, which is the same instant that a positive-going signal appears at the Q output of single shot 82. In the "Auto" switching mode, the "CL" input of flip-flop 83 is supplied with a signal from adjustable comparator 120. The adjustable comparator compares the electrical equivalent of the acoustic wave as received from the subsurface equipment with a predetermined level, and upon the electrical equivalent reaching that level, gives an output which terminates the pulse at the Q output of flip-flop 83. Thus, the initiation of the pulse at the Q output of flip-flop 83 remains in synchronization with the beginning of the pulse at the Q output of single shot 82, but the time of termination of the pulse may vary depending on the time at which the electrical equivalent reaches the predetermined level as set in adjustable comparator 120.

Figure 8:
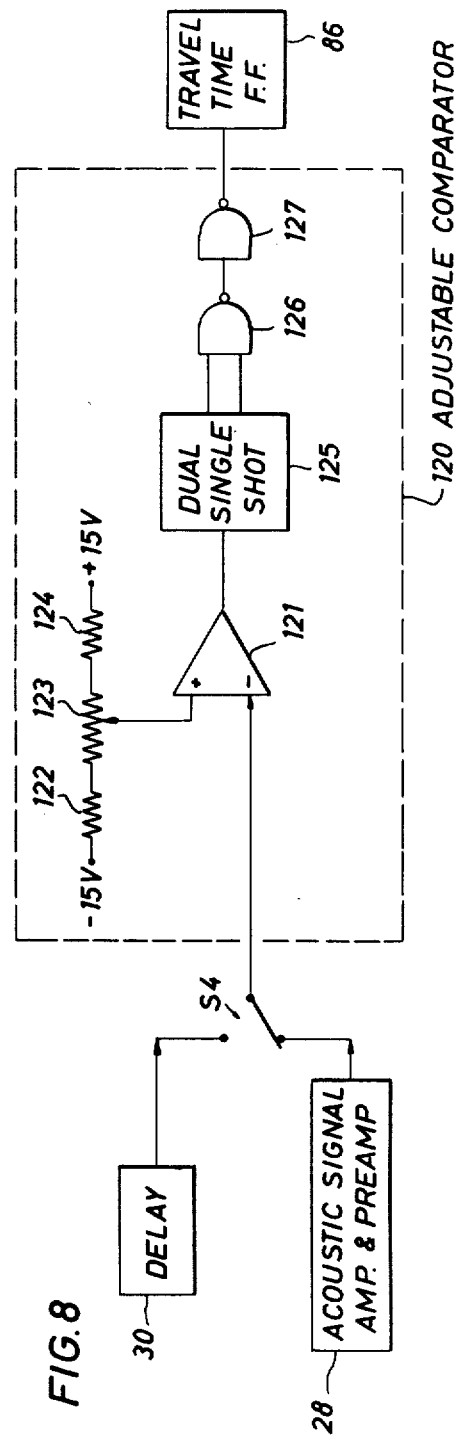
FIG. 8 is a circuit diagram of the adjustable comparator which is a component of the window, caliper and velocity signal generator.

Adjustable comparator 120 may be explained in greater detail as follows, with reference to FIG. 8: This subcircuit consists of a high gain differential operational amplifier 121 which is connected without feedback resistors. The non-inverting input is connected to an adjustable voltage source provided by resistors 122 and 124 and by a potentimeter 123. The adjustable voltage is a reference voltage. The input signal is applied to the inverting input. Whenever the input signal exceeds the reference voltage, the output voltage goes high, at other times being saturated and low. Conversely, if the potentimeter 123 is set to a voltage higher than the input the state of the comparator input will suddenly switch from high to low when the input voltage drops below the reference voltage. The dual single shot 125 has a 100 ms. pulse output duration and prevents the production of rapidly repeating outputs from the comparator and possible resulting erratic operation of other circuits. Output of the dual single shots is taken through a logic or gate comprising the two NAND gates 126 and 127. The output of the OR gate subcircuit feeds the travel time flip-flop 86 and resets it if it has been set by a pulse from the window delay single shot.

Output Q of flip-flop 83, here represented by waveform R, is connected to switch 41 of acoustic signal processor 50 for reasons which will become apparent. It is also connected in common to a first input of a series of dual-input AND gates, one AND gate being associated with each quadrant being investigated by the logging tool. Hereafter, the four quadrants being investigated will each be assigned a channel, so that Channel 1 corresponds to quadrant 1, Channel 2 to quadrant 2, and so on. Thus, AND gate 101 corresponds to Channel 1, AND gate 102 to Channel 2, AND gate 103 to Channel 3, and AND gate 104 to Channel 4. Before the AND gates will generate positive signals at their outputs, both inputs must receive positive signals. Since the pulses represented by waveform R are connected in common to the first input, the state of the second input of each will determine when the respective AND gate exhibits a high output. The pulse trains represented by waveforms D, E, F and G of FIG. 12, which are the outputs of the single shots and flip-flops of demultiplexer pulse generator 65, appear at the second inputs of AND gates 101, 102, 103 and 104, respectively. It is apparent that only one period of time, a pair of AND gates exhibiting high levels at their outputs during each half cycle of sine wave A of FIG. 12. The overall effect of AND gates 101–104 on system operation may be best illustrated by referring to waveforms S-1, S-2, S-3 and S-4 of FIG. 12. These represent the outputs of AND gates 101–104, respectively. This collection of "gating" pulses at the outputs of the AND gates which define the measurement intervals associated with each quadrant being investigated, is connected to accoustic signal processor 50 for reasons which will be explained.

Travel time flip-flop 86 is interposed between adjustable comparator 120 and the "CL" input of flip-flop 83 to provide a signal which is indicative of the time of travel of that portion of the acoustical wavetrain which first produces an electrical equivalent equal the reference voltage selected by potentiometer 123 for the adjustable comparator 120. Thus, the duration of the output pulse of this travel time flip-flop and particularly variations thereof, will be a meassure of travel time about a portion of the circumference of the borehole. This output of flip-flop 83 is averaged and connected to chart recorder 60 for appropriate display, resulting in a convenient caliper measurement of the borehole. The output $\overline{Q}$ of flip-flop 81 is connected to the "CK" input of flip-flop 86, and assuming that the delay period as set by flip-flop 81 marks the beginning of the arrival of the shear wave, output Q of flip-flop 86 initiates a high level pulse at the termination of the pulse at output Q of window delay flip-flop 81. The pulse at output Q of flip-flop 86 is terminated at the instant a negative-going signal is sensed at its "CL" input, which occurs when adjustable comparator 120 senses the predetermined level of the electrical equivalent received from the subsurface equipment as previously discussed. Since this level is chosen to be slightly greater than the largest amplitude associated with the shear wave, output Q of flip-flop 86 will display a series of pulses each of which represents the travel time of the shear wave through one quadrant of the formation surrounding the well bore.

To summarize, the overall function of the window, caliper, and velocity signal generator is to provide a number of gating pulses representing measurement intervals which will allow processing of certain parts of the received acoustic waves to the exclusion of all other parts.

Acoustic Signal Processor 50

Up to the present, the primary purpose of the system circuitry has been to provide the gating pulses for selecting the particular parts of the electrical equivalent received from the well bore that is most useful for analysis. Acoustic signal processor 50 utilizes this "gating" pulse to process the electrical equivalent of the acoustic wave and provide a processed electrical response for each quadrant being investigated in the well bore.

Figure 3A:
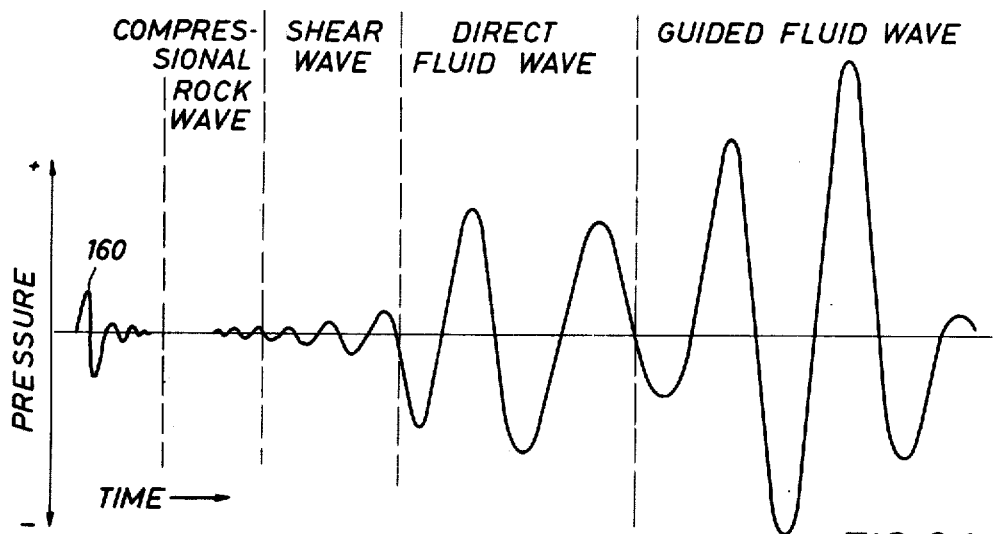
FIG. 3a is a representation of a typical acoustic wavetrain as received by the surface electronics of the invention.
Figure 3B:
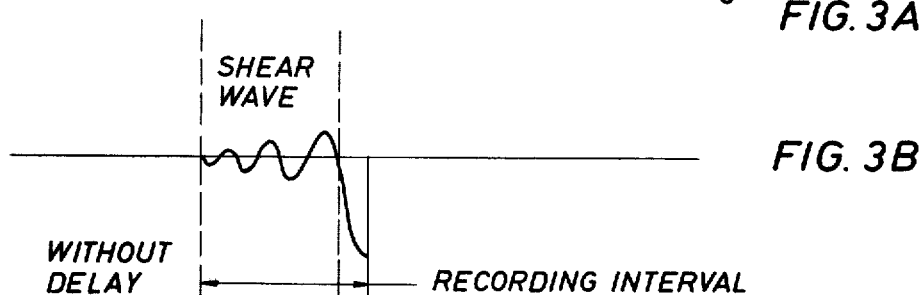
FIG. 3b is a representation of that portion of the acoustic wavetrain which becomes important in the delay feature of the invention.

Referring now to FIGS. 6a and 6b, the signal received at point 29 is the electrical equivalent of the acoustic wave as received at one of receivers R1 or R2 which is amplified and transmitted to the surface. The composition of a typical acoustic wave is shown in FIG. 3(a), where a time break, or marking pulse produced by one of the transmitters, is the first signal received. A short time later, after noise due to the time break has subsided, a compressional rock wave of very small amplitude is recorded. Next, a shear wave of larger amplitude appears, then a compressional direct fluid wave of still larger amplitude, and finally a compressional guided fluid wave appears. This cycle is repeated each time a receiver receives a signal from an associated transmitter, or once for each quadrant being investigated. The resultant wavetrain is amplified by preamplifier 53 and amplifier 52 of processor 50, resulting in a wavetrain resembling waveform T of FIG. 12. The output of amplifier 52 is switchedly connected via switches S4 and S5 to a delay circuit 30 so that bypass of the delay to the next processing circuit may be accomplished if desired. The output of preamplifier 53 is connected to an input of analog tape transport 85, which may be any of several types of magnetic tape recorders well known in the art. Switch S3 allows "relogging" of the well via the recording from tape transport 85 at any time after the logging tool has been passed through the well bore. Relay 30 causes the complete electrical equivalent as received from downhole and amplified to be delayed approximately ¼ cycle of its frequency of oscillation so that the non-delayed signal may be transmitted to adjustable comparator 120 where it is used to allow automatic operation of the system by proper setting of switch S6. Thus, delay 30 may be used to permit a particular part of the electrical equivalent of the acoustic wave to be further processed to the exclusion of any later arriving parts. Particularly, according to the invention, the direct fluid wave, shown in FIG. 3(a) to occur immediately after receipt of the shear wave, is utilized to cause comparator 120 to terminate the square pulse being generated at the output of flip-flop 83 of window, caliper, and velocity signal generator 80 which in turn controls the outputs of AND gates 101-104. Referring to FIG. 3(b) and FIGS. 6a and 6b, comparator 120 senses the first negative-going peak of the direct fluid wave by comparing the electrical equivalent at one input with a potential level at the other input which has been chosen from experimental data. This level is chosen so that it will be greater than peak amplitude received from the shear wave but less than the initial direct fluid wave signal. At point X of the wavetrain of FIG. 3(b) this threshold level is sensed by the comparator, which transmits a signal to flip-flop 83 to terminate the pulse at its Q output. This, in turn, terminates the gating pulse for the channel then operative at the output of one of AND gates 101-104. In the meantime, the electrical equivalent which will be recorded and processed further by acoustic signal processor 50 has been delayed ¼ cycle by delay 30.

Figure 3C:
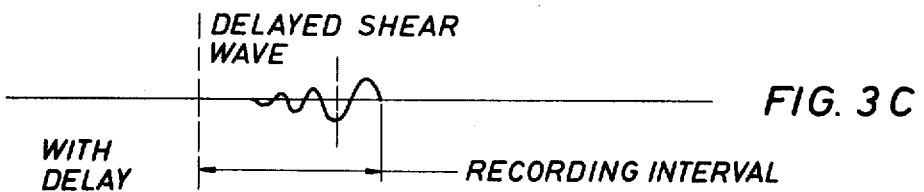
FIG. 3c is a representation of the shear wave portion of the wavetrain which is finally processed if the delay feature of the invention is utilized.

In the manual mode of operation which was previously discussed, any portion of the electrical equivalent of the acoustic wave received may be further processed, at least to the extent that it occurs within the time frame as defined by single shots 70 and 72 and flip-flops 71 and 73 of demultiplexer pulse generator 65. However, assuming for purposes of discussion that delay 30 is utilized, the delayed electrical equivalent is transmitted to window switch 41 whose operation is controlled by output Q of flip-flop 83 of window, caliper, and velocity signal generator 80. Since flip-flop 83 is controlled by comparator 120, only the shortened part of the signal, the shear wave, is transmitted for further processing, as indicated in FIG. 3(c). It should be noted that the intermittent operation of switch 41 is in synchronization with the channel 1-4 operation of AND gates 101-104, the Q output of flip-flop 83 controlling both points. The truncated electrical equivalent of the acoustic wave for each quadrant representing only the shear wave signal is illustrated by waveform V of FIG. 12. This truncated signal is transmitted to germanium rectifier 46 where the positive portion of the signal is rejected, which insures that in no event will a part of the direct fluid wave be processed. This occurs since the first negative-going cycle of the direct fluid wave was used to operate comparator 120, and delay 30 delays the acoustic wave sufficiently to eliminate this negative peak. Any positive direct fluid wave signal is removed by rectifier 46. Integrator 49 processes the rectified signal by charging a capacitor so that a single peak signal for each of quadrant 1-4 results as illustrated by waveform X. The output of integrator 49 is connected to inputs of sampling switches 54, 55, 56 and 57, operation of which are controlled by the pulses at the outputs of AND gates 101-104 represented by waveforms S-1, S-2, S-3 and S-4, respectively. Hence, these sampling switches are intermittently closed to allow transmission of the processed electrical response to the proper channel of chart recorder 60. Switch 54 connects the electrical response from quadrant Q1 to channel 1, switch 65 connects the electrical response from quadrant Q2 to channel 2, and so on for switches 56 and 57. In an alternative mode of operation, circuit 49 may be used to compute the average of the signals received from rectifier 41 for each quadrant. In like manner as before, this signal may be connected to sampling switches 51 for transmission to the appropriate channel of chart recorder 60 which may include a low pass filter to average signals vs. depth. These processed electrical responses may be suitably displayed on a chart versus depth for each channel, resulting in one chart for each quadrant, or if desired, the average or peak of all four quadrants may be computed so that a single processed electrical response for four quadrants may be displayed. Another mode of display particularly helpful in locating vertical fractures invokes utilizing the unprocessed electrical equivalents recorded on the analog tape transport and displaying such unprocessed signals for each quadrant simultaneously or means such as an oscilloscope. In this manner, indications of vertical fractures due to shear wave attenuation may be quickly and easily located.

Receiver Circuitry

Figure 9:
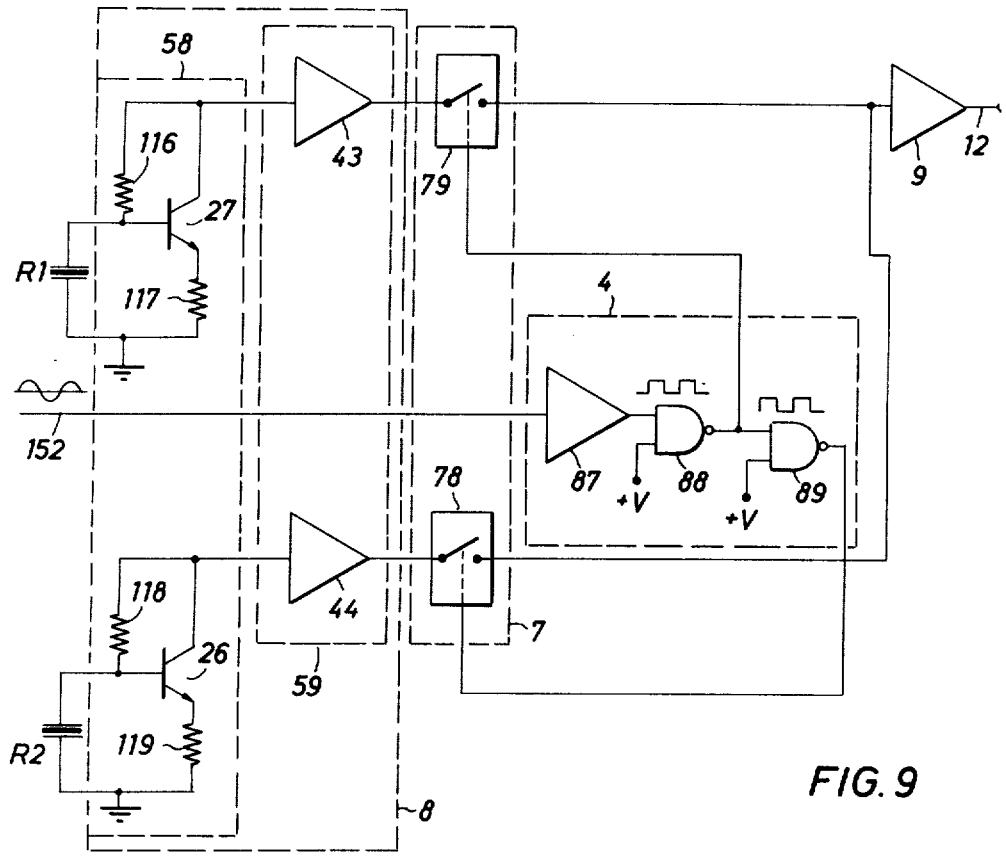
FIG. 9 is a circuit diagram of the subsurface electronic equipment associated with the receiving transducers.

Referring to FIG. 9, the subsurface electronics associated with receivers R1 and R2 will now be explained in greater detail. A set of preamplifiers 58 receive the electrical equivalents of the acoustic waves as supplied by receiving transducers R1 and R2 and provide primary amplification. The preamplifier circuit for receiver R1, comprised of a typical transistor amplifier made up of transistor 27, resistor 116, and resistor 117, transmits the preamplified signal to amplifier 43. Amplifier 43, associated with receiver R1, amplifies the input signal and transmits it to switch 78 of multiplexer 7, whose operation is controlled by multiplexer drive 4. Multiplexer drive 4 receives as its input the sine wave from generator 20 at the surface and generates a square wave which alternates in synchronization with the sine wave. Receiver R2 has associated its operative period the electrical equivalents are transmitted to switch 79 of multiplexer 7. NAND gates 88 and 89 act as inverters so that upon receipt of a high signal at their respective inputs, their outputs generate a low signal and the switch 78 or 79 connected to the respective output opens. It can be seen that the operation of the switches proceeds in an alternating fashion in synchronization with the sine wave from generator 20 so that multiplexing of signals from receivers R1 and R2 take place. The electrical equivalents transmitted by either of switches 78 or 79 is thereafter secondarily amplified by cable driver 9 and transmitted to the surface for further processing by acoustic signal processor 50.

Transmitter Circuitry

Figure 10:
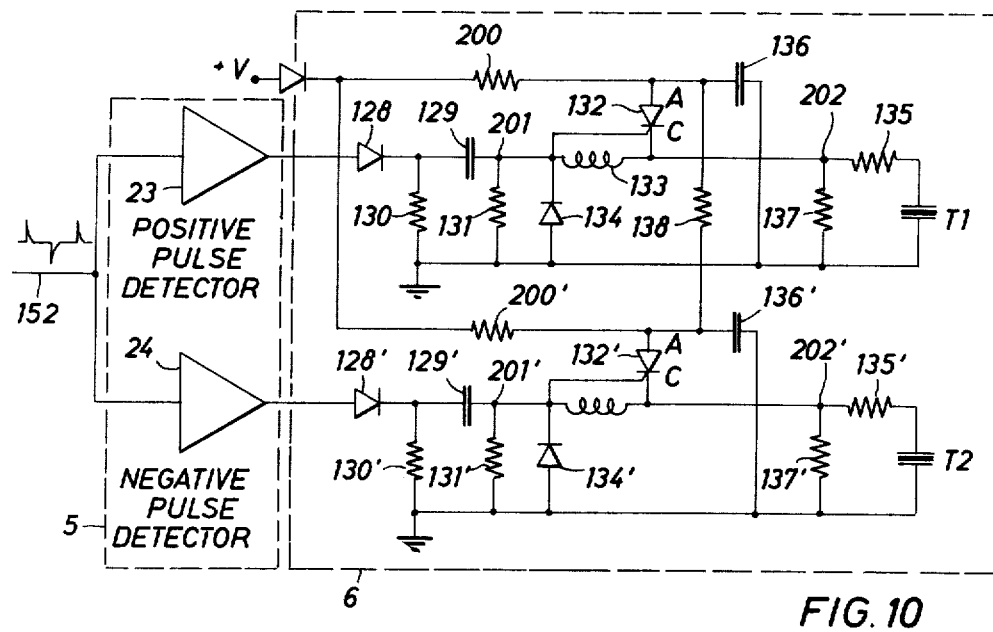
FIG. 10 is a circuit diagram of the subsurface electronics associated with the transmitting transducers, including the latching circuit.

Referring to FIG. 10, the transmitter circuitry for each transmitter T1 or T2 comprises a pulse detector 23 or 24 and a transmitter drive circuit 6 comprised of a latching circuit. The operation of the circuitry associated with transmitter T1 will now be described in detail, and reference to transmitter T2 will be made where necessary for proper explanation.

Positive pulse detector 23 receives at its input the series of alternating positive- and negative-going pulses from pulse generator 21, generating a signal at its output only on receipt of the positive-going pulses. The latching circuit associated with transmitter T1 may be further sub-divided, for purposes of explanation, into a charging circuit and a triggering circuit. The latching circuit serves two functions; it provides the triggering of transmitter T1, and it prevents any transmitter from firing during, or in an interval of predetermined duration immediately following, the actuation of transmitter T1. The last-mentioned period immediately following the actuation of transmitter T1 may be approximately of the same duration as the duration of large acoustical signals following the actuation of a transmitter. This period is determined by the values of capacitors 129 and 136 and resistors 130 and 200, proper selection of which will be explained in the following discussion of the latching circuit operation. Upon receipt of a pulse from positive pulse detector 23 at diode 128, capacitor 129 charges very rapidly, causing a positive pulse to appear at point 201 because of charging current flowing through resistor 131. As a result, a positive pulse appears at the gate electrode of SCR 132, causing capacitor 136 to discharge through resistor 137. This discharge current produces a voltage at point 202 which is applied to the piezoelectric transducer T1 through resistor 135, causing production of a sound pulse. When capacitor 136 is discharged, capacitor 136' also discharges through resistor 138', so that SCR 132' can in no way fire with SCR 132 simultaneously. Thus, the SCRs are in succession, when triggered, latched by three mechanisms; first, the anodes of the SCRs are tied together by resistor 138, which is relatively small, such as 1000 ohms. Thus, as one fires, the voltage of the other is reduced to too low a value for immediate mistriggering. Second, the time constant of resistor 136 and resistor 200 is made about 5 ms., so that once either SCR fires, neither can again fire for about 5 ms. Also, current flowing through resistor 137 momentarily biases the cathode of the SCR positive with respect to its gate, preventing immediate re-triggering of the SCR. Third, the diode 128 causes the capacitor 129 to remain blocked for about 2.4 ms. because of the time constant of resistor 130, resistor 131, and capacitor 129, preventing re-triggering during this time period.

When a negative firing pulses arrives in the downhole instrument, transmitter T2 is actuated in a manner identical with that described above for T1.

From the foregoing, it will be seen that a novel acoustic logging technique has been provided which allows complete and accurate detection of vertical fractures in a wellbore. The versatility of the system allows processing and recording of only the shear waves received to the complete exclusion of later arriving waves at a receiver, or processing and recording of any portion of the complete acoustic wavetrain received. If it is desired to utilize the guided fluid waves received after the shear waves at a particular receiver, this may be accomplished by appropriate adjustments. Recordation of only the shear waves does not depend on the average wave velocity in the formation, since the processing circuitry may be rendered inoperative only after the shear wave has been received. Other novel electronic circuitry has been provided so that the aforementioned advantages may be achieved. Of course, it is apparent that the concept of the invention may be extended to the use of multiple receivers and transmitters by merely duplicating the relevant parts of the component circuitry.

Data obtained from experimental use of the above described system has shown that a particularly useful method of operating the system to identify fracture zones comprises the following steps: Producing a chart recording displaying, as in FIG. 3, the peak amplitude of shear waves propagating along the respective quadrants of a borehole at each depth; producing a chart recording displaying the variations of travel time averaged at each depth for the four respective quadrants for the direct fluid wave; producing a chart recording displaying the amplitude for the guided fluid wave along the respective quadrants at each depth; and, comparing the traces of the pen recordings to determine at what depths there are correlatable reductions in amplitude for both shear waves and guided fluid waves and simultaneously an indication of near normal travel time for the direct fluid wave.

It will be understood that various modifications of the circuit details will occur to those skilled in the art, and it is intended that the invention be limited only by the scope of the appended claims.

What we claim as our invention is:

1. An apparatus for obtaining a circumferential acoustic well log of a borehole comprising:

an elongated logging tool adaptable for passing through the borehole;

a plurality of transducers attached to said logging tool so as to define a path concentric with said borehole, at least two of said transducers functioning as transmitters, and at least two of said transducers functioning as receivers;

wave generating means for generating electrical signals which define measurement intervals, said wave-generating means including an alternating wave source for providing an alternating wave comprised of parts of a wave cycle and, a pulse source for providing one or more synchronizing pulses of short duration during each part of said wave cycle, each pulse being approximately equal in amplitude and duration;

means for transmitting both said alternating wave and said synchronizing pulses to said logging tool over a single conductor;

controlling means for selectively actuating said transmitters and receivers during said measurement intervals, said controlling means being synchronized by said electrical signals such that only one transmitter and one receiver, forming a transmitter-receiver pair, is operative during said measurement interval;

means responsive of said electrical signals for actuating a transmitter to provide a pulse of acoustic energy to be transmitted about an arcuate path between a transmitter and receiver of a transmitter-receiver pair, said path defining at least a portion of the circumference of said borehole, said pulse of acoustic energy generating a transient acoustic wave comprised of shear waves and compressional direct fluid waves and compressional guided fluid waves, one of said last-mentioned waves arriving at the receiver of said transmitter-receiver pair in one time period, the other wave arriving in a successive time period, both acoustic waves arriving at said receiver during a measurement interval;

latching means for preventing any other transmitter from becoming actuated during, or within a measurement interval immediately following, the actuation of said transmitter;

means for providing an electrical response indicative of variations in acoustic energy amplitude caused by said pulse of acoustic energy passing through the wall of said borehole and arriving at a receiver which is actuated during said measurement interval;

means for selectively processing said electrical response from either of said shear waves, said guided fluid waves, or parts or all of each, during each measurement interval, providing recorded signals; and, means for displaying said recorded signals so as to provide an acoustical well log that can be used to detect the presence of vertical fractures or anomalies in the borehole wall.

2. Apparatus according to claim 1, wherein said controlling means includes separating means for separating said alternating wave from said synchronizing pulses.

3. Apparatus according to claim 1, wherein said controlling means for selectively actuating said transmitters includes:

means for receiving said synchronizing pulse from said pulse source; and, means for selectively and momentarily actuating one of said transmitters upon receipt of said synchronizing pulse.

4. Apparatus according to claim 1, wherein said latching means comprises a latching circuit coupled to each transmitter, each latching circuit comprised of a charging circuit and a triggering circuit, said charging circuit and said triggering circuit being electrically coupled one to the other, said charging circuit comprising:

a charging source;

a first capacitance, a first terminal of said first capacitance being coupled to ground potential;

a first resistance coupled on one side to said charging source and on the other side to a second terminal of said capacitance; and, a second resistance coupling each charging circuit to the next succeeding charging circuit via said second terminals of said first capacitances in each charging circuit, said first capacitance and said first resistance having predetermined values and forming an RC circuit such that the RC time constant resulting therefrom is a substantial part of said measurement interval, the effect of said second resistance and said RC circuit being to discharge the charging circuit of each latching circuit each time any charging circuit discharges;

said triggering circuit comprising;

a silicon-controlled rectifier (SCR) having an anode, a cathode, and a gate terminal, said anode being coupled to the second terminal of said first capacitance, an inductance coupled between said cathode and said gate terminal, said cathode being coupled to one side of said transmitter for actuating said transmitter;

a first diode having an anode and a cathode, said last-mentioned anode being coupled to ground potential, said last-mentioned cathode being coupled to the gate terminal;

a third resistance, a first side of said third resistance being coupled to ground potential, a second side of said third resistance being coupled to said gate terminal;

a second capacitance, a first terminal of said second capacitance being coupled to ground potential via said second side of said third resistance;

a fourth resistance, a first side of said fourth resistance being coupled to ground potential, a second side of said fourth resistance being coupled to a second terminal of said second capacitance, said second capacitance and said fourth resistance having predetermined values and forming a second RC circuit such that the RC time constant resulting therefrom is a fractional part of said measurement interval; and, a second diode, having an anode and a cathode, said last-mentioned cathode being coupled to said second terminal of said second capacitance, said last-mentioned anode being coupled to said pulse source, the effect of said second diode and said second RC circuit in combination with said charging circuit being to provide a charging delay whereby no other transmitter is actuated during, or within a measurement interval immediately following, the actuation of a first transmitter.

5. Apparatus according to claim 1, wherein the means for providing an electrical response comprises:

primary amplification means coupled to said receivers for amplifying an electrical equivalent of said variations in acoustic energy amplitude, said primary amplification means comprising a preamplifier and an amplifier;

secondary amplification means coupled to said primary amplification means for transmitting said electrical equivalent from said borehole; and, acoustic signal processing means coupled to said secondary amplification means for providing a processed electrical response indicative of anomalies in said borehole wall.

6. Apparatus according to claim 5, wherein the acoustic signal processing means comprises:

pre-amplifying and amplifying means for further amplifying said electrical equivalent;

delay means coupled to said pre-amplifying and amplifying means for providing a short delay period such that only the earlier arriving of said shear waves and said direct fluid waves is delayed and further processed while the later arriving wave deactuates said means for selective recording said waves and is partially or completely eliminated from said processed electrical response;

switching means coupled to said delay means for providing an operative time period for said acoustic signal processing means defining each measurement interval so that only a particular fraction of said electrical equivalent is further processed;

rectifying means and peak detecting means for further processing said electrical equivalent to provide a single peak signal from said electrical equivalent for each measurement interval, resulting in a processed electrical response; and, sampling means for switchedly connecting in succession said electrical response for each associated measurement interval to said means for displaying.

7. Apparatus according to claim 1, wherein said means for selectively processing said electrical response comprises:

a demultiplexer pulse generator for generating demultiplexing pulses of sufficient width to divide said fractional parts of said wave cycle into at least two parts, each of said demultiplexing pulses being of sufficient duration to include within said duration an associated measurement interval;

a window trigger generator for generating a series of trigger pulses of a predetermined width, each of said trigger pulses being initiated by said synchronizing pulse and being terminated by the termination of said demultiplexing pulse; and, a window, caliper, and velocity signal generator for combining said demultiplexing pulse and said trigger pulses so as to provide a window gate pulse of a variable width, the initiation and termination of said window gate pulse being variable in time to define the duration of said measurement interval, so as to provide a period of operation for selectively processing said electrical response.

8. Apparatus according to claim 7, wherein the means for terminating said window gate pulse comprises a comparator for comparing an electrical equivalent of said acoustic wave with a predetermined signal level, said comparator becoming operative to terminate said window gate pulse upon receiving said electrical equivalent of a predetermined magnitude.

9. Apparatus for acoustic logging of earth formations surrounding a well bore including a downhole sonde with multiple transducers suspended in said well bore, some of said transducers functioning as transmitters and others functioning as receivers, and control means for selectively actuating and deactuating said transducers in a predetermined sequence, said control means comprising:

a signal source;

means for selectively and in a predetermined sequence actuating and deactuating each of said receivers;

latching means for selectively and in a predetermined sequence actuating and deactuating each of said transmitters such that no other transmitter may become actuated during a time period of predetermined duration which includes the actuation of a first transmitter, said latching means comprising:

latching circuit comprised of a charging circuit and a triggering circuit electrically coupled one to the other, said charging circuit comprising:

a charging source;

a first capacitance, a first terminal of said first capacitance being coupled to ground potential;

a first resistance coupled on one side to said charging source and on the other side to a second terminal of said first capacitance; and, a second resistance coupling each charging circuit to the next succeeding charging circuit via said second terminals of said first capacitances in each charging circuit, said first capacitance and said first resistance having predetermined values and forming an RC circuit such that the RC time constant resulting therefrom is a substantial part of said time period, the effect of said second resistance and said RC circuit being to discharge the charging circuit of each latching circuit each time any charging circuit discharges;

said triggering circuit comprising:

a silicon controlled rectifier (SCR) having an anode, a cathode, and a gate terminal, said anode being coupled to the second terminal of said first capacitance;

an inductance coupled between said cathode and said gate terminal for storing a charge, said cathode being coupled to one side of said transmitter for activating said transmitter;

a first diode, having an anode and a cathode, said last-mentioned anode being coupled to ground potential, said last-mentioned cathode being coupled to the gate terminal of said SCR;

a third resistance, a first side of said third resistance being coupled to ground potential, a second side of said third first resistance being coupled to said gate terminal;

a second capacitance, a first terminal of said second capacitance being coupled to ground potential via said second side of said third resistance;

a fourth resistance, a first side of said fourth resistance being coupled to ground potential, a second side of said fourth resistance being coupled to a second terminal of said second capacitance, said second capacitance and said fourth resistance having predetermined values and forming a second RC circuit such that the RC time constant resulting theefrom is a fractional part of said time period; and, a second diode, having an anode and a cathode, said last-mentioned cathode being coupled to said second terminal of said second capacitance, said last-mentioned anode being coupled to said signal source, the effect of said second diode and said second RC circuit in combination with said charging circuit being to provide a charging delay whereby only one transmitter is activated during any one time period.

10. An apparatus for obtaining a circumferential acoustic well log of a borehole including a logging tool having a plurality of transducers functioning as transmitters for transmitting acoustic pulses and receivers for receiving acoustic energy variations in the form of shear waves and direct fluid waves, and suspended in said borehole by conductive cable means extending from the surface of the earth, surface apparatus comprising:

wave generating means for generating periodic electrical signals which define measurement intervals and selectively and in a predetermined sequence actuate one of said transmitters and one of said receivers during said measurement interval, said receivers providing an electrical equivalent of said acoustic energy variations;

acoustic signal processing means for processing said electrical equivalent to provide a processed electrical response of said acoustic energy variations, said acoustic signal processing means comprising:

pre-amplifying and amplifying means for amplifying said electrical equivalent;

delay means switchedly connected to said amplifying means for providing a short delay period of predetermined duration such that only the earlier arriving of said shear waves and said direct fluid waves is delayed and further processed while the later arriving wave may be eliminated from further processing by said acoustic signal processing means;

switching means switchedly connected to said delay means and said preamplifying and amplifying means for providing an operative time period for said acoustic signal processing means defining each measurement interval so that only a particular fraction of said electrical equivalent is further processed;

rectifying means and peak detecting means connected to said switching means for further processing said electrical equivalent to provide a single peak signal from said electrical equivalent for each measurement interval, resulting in a processed electrical response; and, sampling means connected to said peak detecting means for switchedly connecting in a predetermined order said processed electrical response for each measurement interval to a display means;

selective processing means for controlling said sampling means such that processed electrical responses from either of said shear waves, said direct fluid waves, or parts or all of each, during each measurement interval are connected to said display means; and, display means for providing a visual display wherein said part or all of each processed electrical response may be displayed.

11. An apparatus according to claim 10, wherein said display means includes means for displaying said processed electrical response as a function of depth of said wellbore.

12. An apparatus according to claim 10, wherein said selective processing means comprises:

pulse generating means for generating demultiplexing pulses of a predetermined width, each of said demultiplexing pulses being of sufficient duration to include within said duration an associated measurement interval;

trigger generating means for generating a series of trigger pulses of a predetermined width, each of said trigger pulses being initiated at the instant of activation of each of said transmitters and terminated by the termination of said demultiplexing pulse; and, window signal generating means for combining said demultiplexing pulse and said trigger pulse so as to provide a window gate pulse of a variable width, the initiation and termination of said window gate pulse being variable in time to define the duration of said measurement interval, so as to provide a period of operation for selectively recording said processed electrical response.

13. An apparatus according to claim 10, including analog recording means for simultaneously recording said periodic electrical signals and said electrical equivalents such that said visual display may be reproduced therefrom.

14. An apparatus according to claim 13, including means for visually displaying the unprocessed electrical equivalents.

15. Apparatus for electrically processing the electrical equivalent of an acoustic signal comprised of shear waves and guided fluid waves received from an acoustic well logging tool, said logging tool being disposed in a well bore, said acoustic signal being received therefrom during one of several successive measurement intervals and converted into said electrical equivalent thereby, the electrical processing apparatus comprising:

preamplifying and amplifying means for amplifying said electrical equivalent;

delay means switchedly connected to said preamplifying and amplifying means for providing a short delay period of predetermined duration such that only the earlier arriving of the electrical equivalent of said shear waves and said direct fluid waves is delayed and further processed while the later arriving wave may be eliminated from further processing by said electrical processing apparatus;

switching means switchedly connected to said delay means and said preamplifying and amplifying means for providing an operative time period for said electrical processing apparatus during each measurement interval so that only a particular fraction of said electrical equivalent is further processed;

rectifying means and peak detecting means connected to said switching means for further processing said electrical equivalent to provide a single peak signal from said electrical equivalent for each measurement interval, resulting in a processed electrical response; and, sampling means connected to said peak detecting means for switchedly connecting in a predetermined order said processed electrical response for each measurement interval to a means for displaying said processed electrical response.

16. Apparatus according to claim 1, including analog recording means switchedly connected thereto for simultaneously recording each of said alternating wave, said synchronizing pulses, and said electrical equivalents such that said acoustic well log of a borehole may be reproduced therefrom.

17. An apparatus according to claim 12, wherein the means for terminating said window gate pulse comprises a comparator for comparing an electrical equivalent of said acoustic energy variation with a predetermined signal level, said comparator becoming operative to terminate said window gate pulse upon receiving said electrical equivalent of a predetermined magnitude.

18. An apparatus according to claim 17, wherein said predetermined signal level is set to be approximately equal to or less than the electrical equivalent of the maximum level of the first cycle of said direct fluid wave.

19. Apparatus according to claim 16, including means for visually displaying simultaneously the electrical equivalents from each arcuate path.

20. A method of obtaining a circumferential acoustic well log of a borehole comprising:

passing an elongated logging tool through the borehole, said logging tool having attached thereto a plurality of transducers, some of which function as transmitters and some of which function as receivers;

generating alternating and periodic electrical signals for defining discrete measurement intervals;

transmitting said electrical signals to said transmitters and receivers;

selectively actuating said transmitters and receivers during said measurement intervals such that only one transmitter and one receiver is operative during a measurement interval, said actuation being synchronized by said periodic electrical signals, said transmitter actuation providing a pulse of acoustic energy which is transmitted about an arcuate path defining a portion of the circumference of the borehole, said pulse of acoustic energy generating a continuous acoustic wave comprised of shear waves and compressional waves, said receiver receiving said acoustic wave during a measurement interval;

preventing any other transmitter from becoming actuated during, or within a measurement interval immediately following, the actuation of a first transmitter;

providing an electrical response indicative of variations in acoustic energy amplitude caused by said pulse of acoustic energy passing through the wall of said borehole and arriving at a receiver which is actuated during said measurement interval;

delaying said electrical response such that only the earlier arriving of said shear waves and said compressional waves is delayed and further processed while the later arriving wave deactuates said processing of said electrical response during each measurement interval to provide recorded signals; and displaying said recorded signals so as to provide an acoustic well log that can be used to detect the presence of vertical fractures or anomalies in the borehole wall.

21. A method according to claim 13 wherein said part of a cycle comrises a half-cycle of said alternating wave.

* * * * *